United States Patent
Park et al.

(10) Patent No.: US 8,427,768 B2
(45) Date of Patent: Apr. 23, 2013

(54) OPTICAL FILTER FOR COMPENSATING FOR COLOR SHIFT PROVIDED IN FRONT OF A DISPLAY PANEL OF A DISPLAY DEVICE AND DISPLAY DEVICE HAVING THE SAME

(75) Inventors: Seong Sik Park, ChungCheongNam-Do (KR); Seung Won Park, ChungCheongNam-Do (KR); Sung Nim Jo, ChungCheongNam-Do (KR); In Sung Sohn, ChungCheongNam-Do (KR); Sang Cheol Jung, ChungCheongNam-Do (KR); Ji Yoon Yeom, ChungCheongNam-Do (KR); Eui Soo Kim, ChungCheongNam-Do (KR)

(73) Assignee: Samsung Corning Precision Materials Co., Ltd (KR)

( * ) Notice: Subject to any disclaimer, the term of this patent is extended or adjusted under 35 U.S.C. 154(b) by 423 days.

(21) Appl. No.: 12/563,447

(22) Filed: Sep. 21, 2009

(65) Prior Publication Data

US 2010/0073794 A1    Mar. 25, 2010

(30) Foreign Application Priority Data

| Sep. 22, 2008 | (KR) | 10-2008-0092655 |
| Sep. 22, 2008 | (KR) | 10-2008-0092656 |
| Sep. 22, 2008 | (KR) | 10-2008-0092657 |
| Oct. 7, 2008 | (KR) | 10-2008-0098120 |
| Feb. 6, 2009 | (KR) | 10-2009-0009883 |
| Sep. 17, 2009 | (KR) | 10-2009-0087906 |

(51) Int. Cl.
*G02B 5/22* (2006.01)

(52) U.S. Cl.
USPC .............. 359/885; 353/97; 348/786; 349/106

(58) Field of Classification Search .................. None
See application file for complete search history.

(56) References Cited

U.S. PATENT DOCUMENTS

| 3,884,695 | A | * | 5/1975 | Gallaro et al. .................. 430/27 |
| 2011/0116025 | A1 | * | 5/2011 | Park et al. ..................... 349/106 |
| 2011/0205632 | A1 | * | 8/2011 | Park et al. ..................... 359/599 |
| 2011/0242463 | A1 | * | 10/2011 | Park et al. ..................... 349/106 |

OTHER PUBLICATIONS

J. R. Trimmier, R. S. Gold, K. E. Jachimowicz, K. R. Sarma, L. D. Silverstein, 'Full-color subtractive light valve for display applications', Proc. SPIE, vol. 1257, pp. 95-103; 1990.*

* cited by examiner

*Primary Examiner* — Arnel C Lavarias
(74) *Attorney, Agent, or Firm* — Lerner, David, Littenberg, Krumholz & Mentlik, LLP

(57) ABSTRACT

An optical filter for compensating for color shift is provided in front of a display panel of a display device. The optical filter includes a background layer and a green wavelength absorption pattern provided with a predetermined thickness on the background layer. The green wavelength absorption pattern absorbs a green wavelength of light. The green wavelength absorption pattern contains a material that absorbs a green wavelength of light in the range of 510 nm to 560 nm, and can also contain a white light absorbing material. A green's complementary color absorbing part absorbs a wavelength of light complementary to green, and contains at least one of a material absorbing a blue wavelength of light in the range of 440 nm to 480 nm and a material absorbing a red wavelength of light in the range of 600 nm to 650 nm.

23 Claims, 21 Drawing Sheets

PRIOR ART

PRIOR ART

PRIOR ART

PRIOR ART

Normalization

OPTICAL FILTER FOR COMPENSATING FOR COLOR SHIFT PROVIDED IN FRONT OF A DISPLAY PANEL OF A DISPLAY DEVICE AND DISPLAY DEVICE HAVING THE SAME

CROSS REFERENCE TO RELATED APPLICATION

The present application claims priority to Korean Patent Application Numbers 10-2008-0092655 filed on Sep. 22, 2008, 10-2008-0092656 filed on Sep. 22, 2008, 10-2008-0092657 filed on Sep. 22, 2008, 10-2008-0098120 filed on Oct. 7, 2008, 10-2009-0009883 filed on Feb. 6, 2009, and 10-2009-0087906 filed on Sep. 17, 2009 the entire contents of which application is incorporated herein for all purposes by this reference.

BACKGROUND OF THE INVENTION

1. Field of the Invention

The present invention relates to an optical filter for compensating for color shift, and more particularly, to an optical filter, which is provided in front of a display panel to minimize color shift according to an increase in the viewing angle, and a display device having the same.

2. Description of Related Art

In response to the recent emergence of high-level information societies, components and devices related to image displays are being significantly improved and rapidly distributed. Among them, image-displaying devices to be used for televisions, monitors of personal computers, etc. are being widely distributed. In addition, there are attempts to enlarge the size while reducing the thickness of display devices.

In general, a Liquid Crystal Display (LCD) is one type of flat panel display that displays images using liquid crystal. The LCD is widely used throughout the industry since it has advantages such as light weight, low drive voltage, and low power consumption compared to other display devices.

FIG. 1 is a conceptual view schematically illustrating the basic structure and operating principle of an LCD 100.

For example, a conventional Vertical Alignment (VA) LCD includes two polarizer films 110 and 120, the optical axes of which are perpendicular to each other. Liquid crystal molecules 150 having birefringence characteristics are arranged between two transparent substrates 130, which are coated with transparent electrodes 140. When an electric field is applied from a power supply unit 180, the liquid crystal molecules move and are aligned perpendicular to the electric field.

Light emitted from a backlight unit is linearly polarized after passing through the first polarizer film 120.

As shown in the left of FIG. 1, liquid crystal remains perpendicular to the substrates when the power is off. The liquid crystal, in this state, can not have any effect on the polarization of the light. As a result, the light maintaining the linearly-polarized state is blocked by the second polarizer film 110, the optical axis of which is perpendicular to that of the first polarizer film 120.

As shown in the right of FIG. 1, when voltage is applied, the liquid crystal shifts to a horizontal position parallel to the substrates, between the two orthogonal polarizer films 110 and 120, in response to the electric field. Thus, the linearly-polarized light from the first polarizer film is converted into another linearly-polarized light, the polarization direction of which is perpendicular to that of the linearly-polarized light passing from the first polarizer film, circularly-polarized light, or elliptically polarized light while passing through the liquid crystal molecules just before it reaches the second polarizer film. The converted light is then able to pass through the second polarizer film. It is possible to gradually change the orientation of the liquid crystal from the vertical position to the horizontal position by adjusting the intensity of the electric field, and to thereby control the intensity of light emission.

FIG. 2 is a conceptual view illustrating the orientation and optical transmittance of liquid crystal depending on the viewing angle.

When liquid crystal molecules are aligned in a predetermined direction in a pixel 220, the orientations of the liquid crystal molecules look different from one another according to the viewing angle.

When viewed from the front left along a line 210, the liquid crystal molecules look as if they are aligned in a substantially horizontal orientation 212, and the image is relatively brighter. When viewed from the front along a line 230, the liquid crystal molecules are observed as being aligned in an orientation 232, which is the same as the actual orientation of the liquid crystal molecules inside the pixel 220. In addition, when viewed from the front left along a line 250, the liquid crystal molecules look as if they are aligned in a substantially vertical orientation 252, and the image is relatively darker.

Accordingly, the viewing angle of the LCD is greatly limited compared to other displays that spontaneously emit light since the intensity and color of light of the LCD varies according to a change in the viewing angle. In order to improve the viewing angle, a number of researches have been carried out.

FIG. 3 is a conceptual view illustrating a conventional approach to reducing a variation in contrast ratio and color shift depending on the viewing angle.

Referring to FIG. 3, a pixel is divided into two pixel parts, that is, first and second pixel parts 320 and 340, of which the orientations of liquid crystal are symmetrical to each other. Both the orientation of liquid crystal in the first pixel part 320 and the orientation of liquid crystal in the second pixel part 340 can be seen. The intensity of light reaching the user is the total intensity of light from the two pixel parts.

When viewed from the front left along a line 310, liquid crystal molecules in the first pixel part 320 look as if they are aligned in the horizontal orientation 312, and liquid crystal molecules in the second pixel part 320 look as if they are aligned in the vertical orientation 314. Then, the first pixel part 320 can look bright. Likewise, when viewed from the front right along a line 350, the liquid crystal molecules in the first pixel part 320 look as if they are aligned in the vertical orientation 352, and the liquid crystal molecules in the second pixel part 340 look as if they are aligned in the horizontal orientation 354. Then, the second pixel part 340 can look bright. In addition, when viewed from the front along a line 330, the liquid crystal molecules are observed as being aligned in orientations 332 and 334, which are the same as the actual orientations of the liquid crystal molecules inside the pixel parts 320 and 340. Accordingly, the brightness of the image observed by the user remains the same or similar even when the viewing angle changes and is symmetrical about the vertical center line of the image. This, as a result, makes it possible to reduce a variation in contrast ratio and color shift depending on the viewing angle.

FIG. 4 is a conceptual view illustrating another conventional approach to reducing variation in contrast ratio and color shift depending on the viewing angle.

Referring to FIG. 4, an optical film 420 having birefringence characteristics is added. The birefringence characteristics of the optical film 420 are the same as those of liquid crystal molecules inside a pixel 440 of an LCD panel and have the orientation symmetrical to that of the liquid crystal molecules. Due to the orientations of both the liquid crystal molecules inside the pixel 440 and the birefringence material of the optical film, the intensity of light reaching the user is the total intensity of light passing through both the optical film 420 and the pixel 440.

Specifically, when viewed from the front left along a line 410, the liquid crystal molecules inside the pixel 440 look as if they are aligned in the horizontal orientation 414 and imaginary liquid crystal molecules of the optical film 420 look as if they are aligned in the vertical orientation 412. The resultant intensity of light is the total intensity of light passing through both the optical film 420 and the pixel 440. Likewise, when viewed from the front right along a line 450, the liquid crystal molecules inside the pixel 440 look as if they are aligned in the vertical orientation 454 and the imaginary liquid crystal molecules of the optical film 420 look as if they are aligned in the horizontal orientation 452. The resultant intensity of light is the total intensity of light passing through both the optical film 420 and the pixel 440. In addition, when viewed from the front along a line 430, the liquid crystal molecules are observed as being aligned in orientations 434 and 432, which are the same as the orientations of the liquid crystal molecules inside the pixel 440 and the imaginary liquid crystal molecules of the optical film 420, respectively.

However, even if the approaches shown in FIGS. 3 and 4 are applied, color shift still exists according to the viewing angle, and thus color changes as the viewing angle increases.

The information disclosed in this Background of the Invention section is only for enhancement of understanding of the background of the invention and should not be taken as an acknowledgment or any form of suggestion that this information forms the prior art that is already known to a person skilled in the art.

BRIEF SUMMARY OF THE INVENTION

Various aspects of the present invention provide an optical filter capable of securing the wide viewing angle and improving the image quality of a display device by minimizing color shift according to an increase in the viewing angle.

Various aspects of the present invention also provide an optical filter capable of minimizing color shift over entire compound colors, which include red-based compound colors (such as sony red and moderate red) and blue-based compound colors (such as sony blue, purple, and purplish blue), when the viewing angle increases.

In an aspect of the present invention, the optical filter for compensating for color shift, provided in front of a display panel of a display device, may include a background layer; and a green wavelength absorption pattern provided with a thickness on the background layer. The green wavelength absorption pattern may absorb a green wavelength of light.

The green wavelength absorption pattern may contain a green wavelength absorbing material that absorbs a green wavelength of light in the range of 510 nm to 560 nm.

The green wavelength absorption pattern may further contain a white light absorbing material.

The optical filter may further include a green's complementary color absorbing part that absorbs a wavelength of light complementary to green.

The green's complementary color absorbing part may contain at least one selected from the group consisting of a blue wavelength absorbing material that absorbs a blue wavelength of light in the range of 440 nm to 480 nm and a red wavelength absorbing material that absorbs a red wavelength of light in the range of 600 nm to 650 nm.

The optical filter may further include a first thick-film layer, a first thin-film layer, and a second thick-film layer, which are stacked over one another in the order named.

According to exemplary embodiments of the present invention as set forth above, the optical filter can secure the wide viewing angle and improve the image quality of a display device by minimizing color shift according to an increase in the viewing angle using the green wavelength absorption pattern.

In addition, exemplary embodiments of the invention can also minimize color shift over entire compound colors including red-based compound colors such as sony red and moderate red and blue-based compound colors such as sony blue, purple, and purplish blue as the viewing angle increases.

Furthermore, the green wavelength absorption pattern is provided to compensate for color shift according to an increase in the viewing angle, and the green's complementary color absorbing part is provided to prevent a color change of light emitted in the forward direction from the display, so that the original color of the display can be maintained.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 15 and 16 are a pair of graphs illustrating the effect of refractive index over color shift in the optical filter having the green wavelength absorption pattern provided on the background layer, in which FIG. 15 shows color shift according to the viewing angle in a case where the refractive index of the background layer is the same as that of the green wavelength absorption pattern, and FIG. 16 shows color shift according to the viewing angle in a case where the refractive index of the background layer is greater than that of the green wavelength absorption pattern by 0.06;

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Comparative Embodiment

Figure 1:
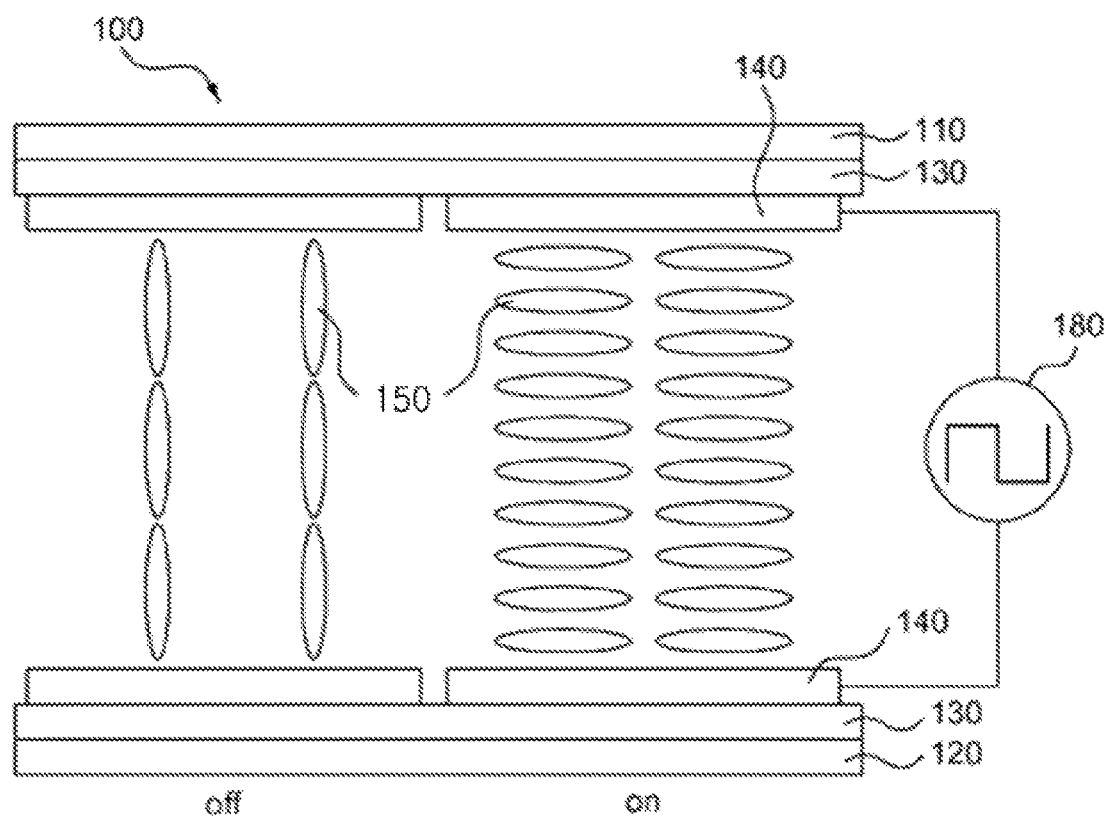
FIG. 1 is a conceptual view schematically illustrating the basic structure and operating principle of an LCD.
Figure 2:
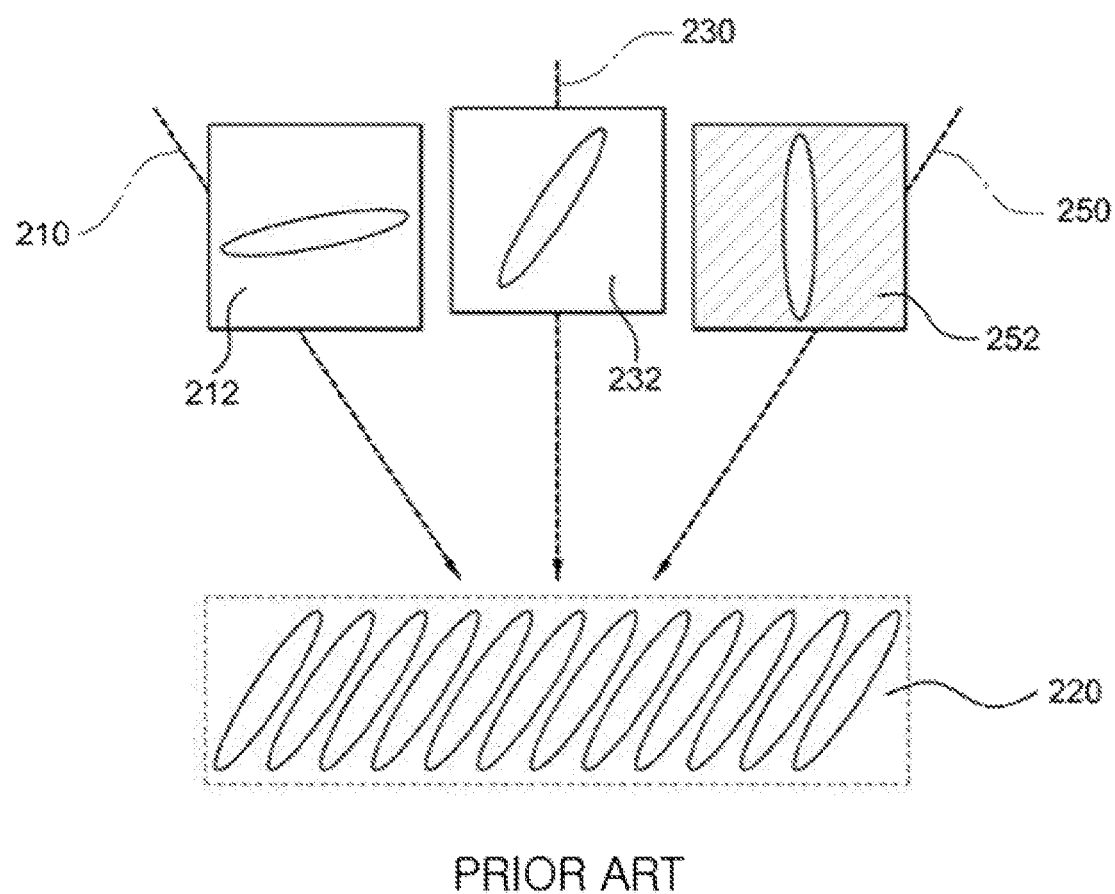
FIG. 2 is a conceptual view illustrating the orientation and optical transmittance of liquid crystal according to viewing angle.
Figure 3:
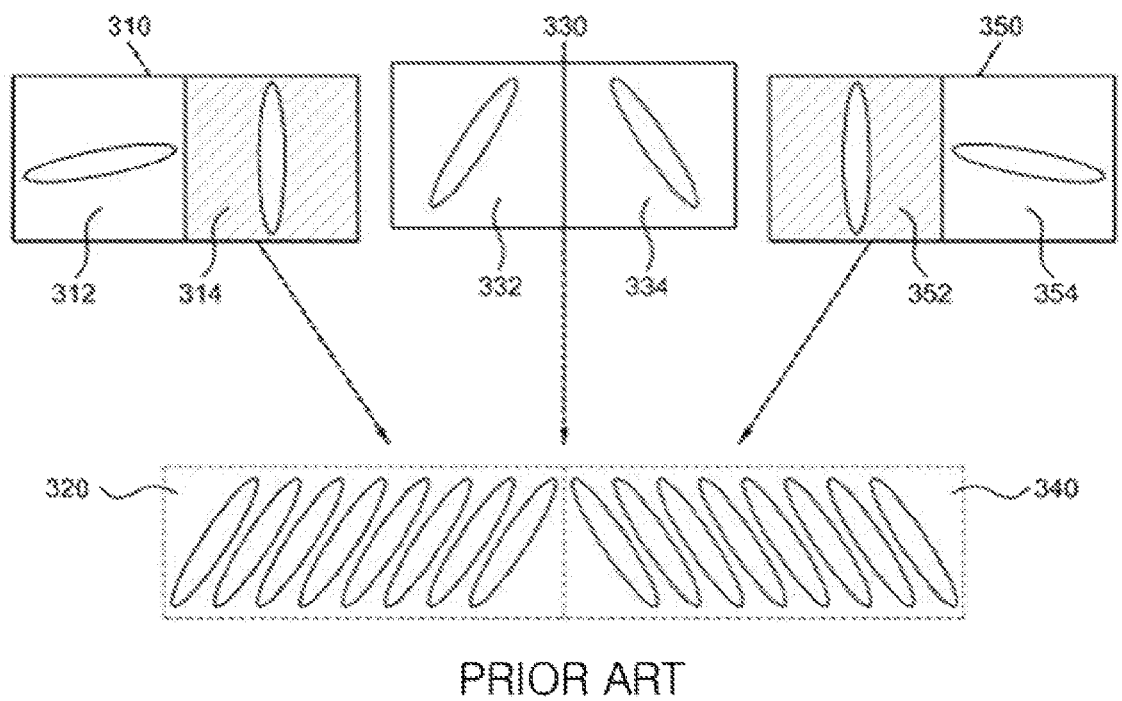
FIG. 3 is a conceptual view illustrating a conventional attempt to reduce variation in contrast ratio and color shift depending on the viewing angle.
Figure 4:
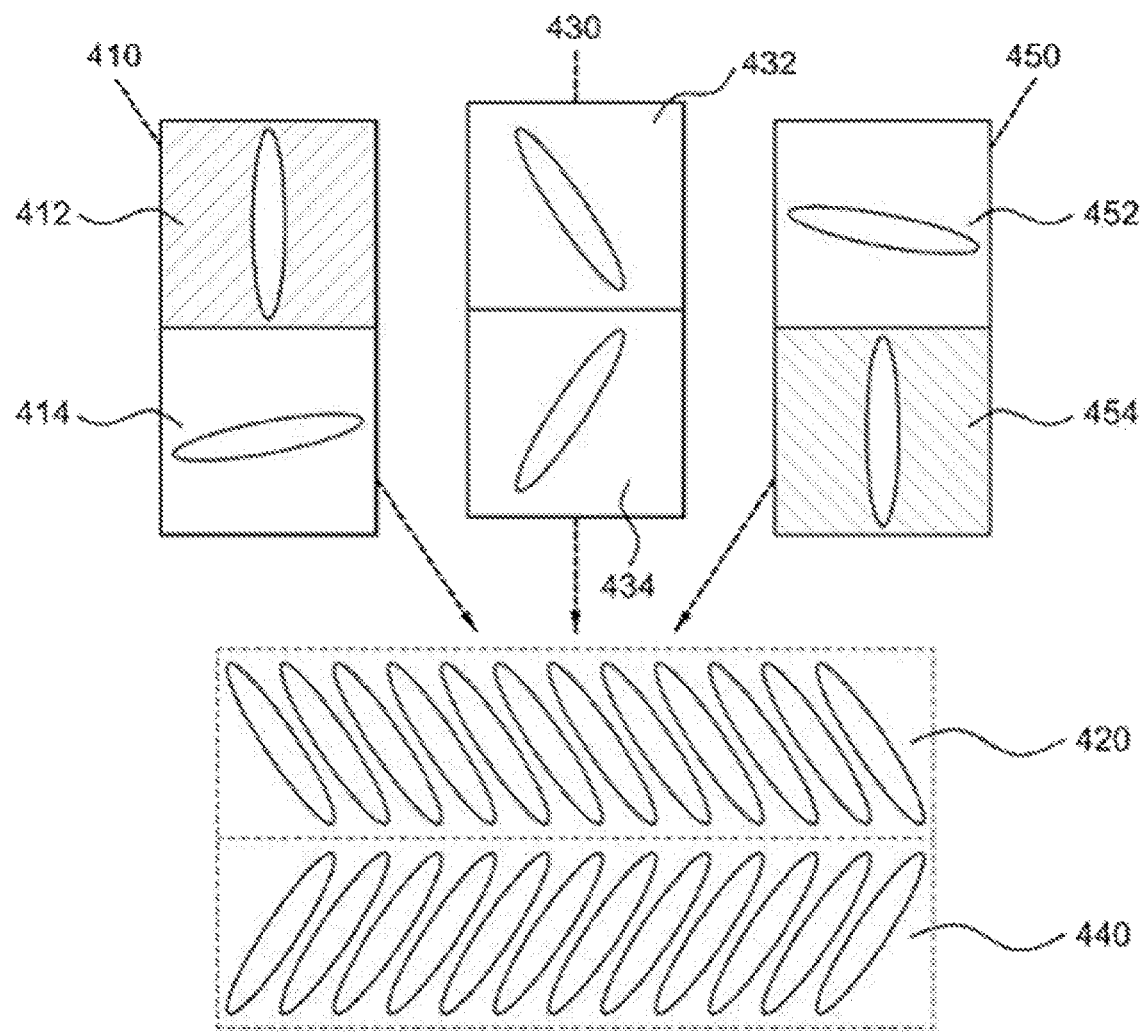
FIG. 4 is a conceptual view illustrating another conventional attempt to reduce variation in contrast ratio and color shift depending on the viewing angle.
Figure 5:
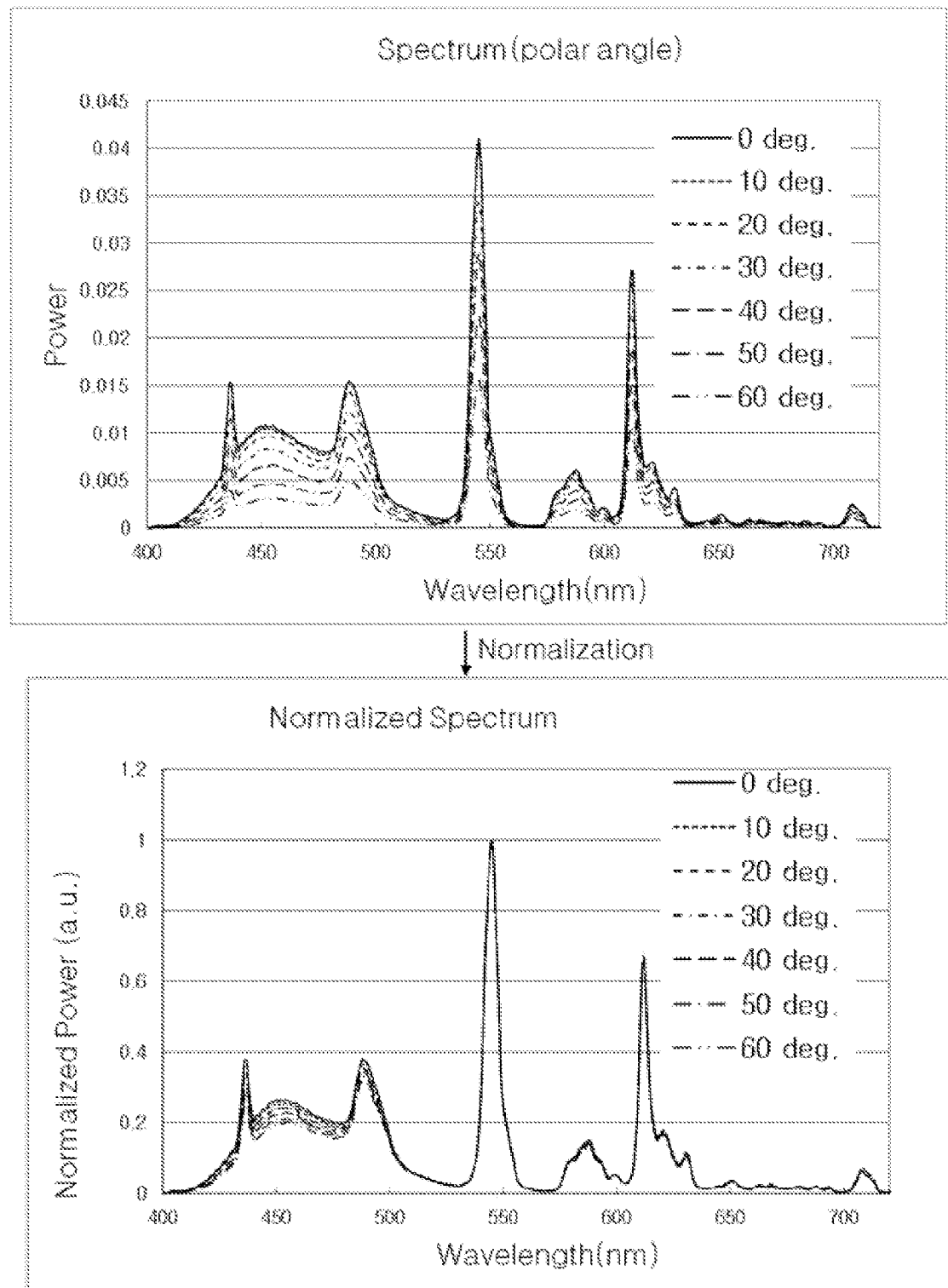
FIG. 5 is a pair of graphs illustrating variations in a spectrum according to an increase in the viewing angle, when a conventional LCD to which both the approaches to compensating for color shift shown in FIGS. 3 and 4 are applied, displays white-light at the full gray scale level.

FIG. 5 is a pair of graphs illustrating variations in a spectrum according to an increase in the viewing angle, when a conventional LCD to which both the approaches to compensating for color shift shown in FIGS. 3 and 4 are applied, displays white-light at the full gray scale level.

As shown in the figure, the intensity of the spectrums gradually decreases in inverse proportion to the viewing angle. When the spectrums are normalized by dividing each of the spectrums by its maximum value in order to accurately examine the degree of decrease according to the wavelength range, it can be appreciated that the intensity of normalized spectrums decreases in the blue wavelength range of 400 nm to 500 nm according to an increase in the viewing angle, even though the intensity is the same in the other wavelength ranges according to an increase in the viewing angle. This indicates that the intensity of spectrum of light decreases more in the blue wavelength range of 400 nm to 500 nm than in the other wavelength ranges according to an increase in the viewing angle. Accordingly, yellowish color, which is complementary to blue, increases as the viewing angle increases. Such color change degrades image quality.

Figure 6:
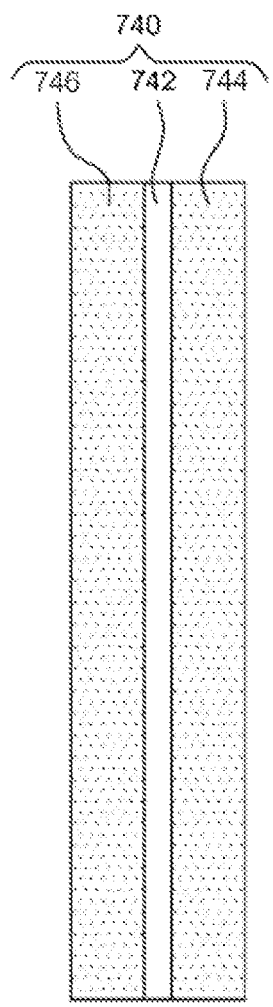
FIG. 6 is a cross-sectional view illustrating an optical filter for compensating for color shift proposed in a previously-filed application of the applicant.

FIG. 6 is a cross-sectional view illustrating an optical filter 700 for compensating for color shift proposed in a previously-filed application of the applicant.

The optical filter 700 shown in FIG. 6 includes a thin-film layer 742 and first and second thick film layers 744 and 746 in order to reduce color shift according to an increase in the viewing angle. The thin-film layer 742 has a thickness 780 nm or less and a first refractive index. The first thick-film layer 744 is provided on one surface of the thin-film layer 742, is thicker than the thin-film layer 742, and has a second refractive index. The second thick-film layer 746 is provided on the opposite surface of the thin-film layer 742, is thicker than the thin-film layer 742, and has a third refractive index.

The optical filter can reduce a relatively larger decrease in the luminance of light in a wavelength range of 300 nm to 500 nm, which occurs while the light passes through liquid crystal, according to an increase in the viewing angle in an LCD. The optical filter can thereby reduce the color shift in white light at the full gray scale level according to the increase in the viewing angle.

Figure 7:
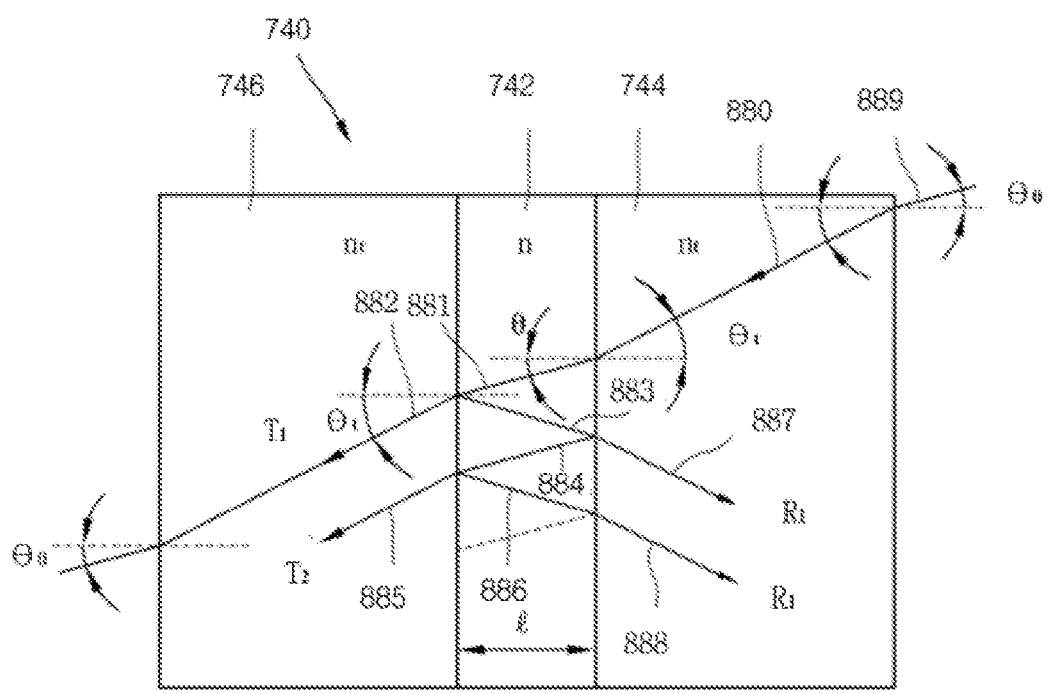
FIG. 7 is a diagram illustrating the principle that the optical filter shown in FIG. 6 compensates for color shift.

FIG. 7 is a diagram illustrating the principle that the optical filter shown in FIG. 6 compensates for color shift.

The thickness of the thin-film layer 742 is the same as or smaller than the wavelength range of visible light. For this, the thickness of the thin-film layer 742 is 780 nm or less. If the thickness of the thin-film layer 742 is greater than 780 nm, neither constructive nor destructive interference occurs in the visible light range.

In addition, the first and second thick-film layers 744 and 746 are thicker than the thin-film layer 742. Accordingly, the thickness of the thick-film layers 744 and 746 is greater than 780 nm, and may be even several mm. The first and second thick-film layers 744 and 746 can have the same thickness or different thicknesses.

The thin-film layer 742, the first thick-film layer 744, and the second thick-film layer 746 have first, second, and third refractive indices, respectively. The first refractive index can be lower or higher than the second index and/or the third refractive index.

The optical filter can be fabricated by sandwiching a thin-film layer with a lower refractive index between thick-film layers with a higher refractive index. For example, the refractive index of the first and second thick-film layers 744 and 746 can be in the range of 2 to 4, and the refractive index of the thin-film layer can be in the range of 1 to 2.

Conversely, a thin-film layer with a higher refractive index can be sandwiched between thick-film layers with a lower refractive index. In this case, one or more of the thick-film layers can be made of glass. If a base substrate is made of tempered glass, it can be used as a thick-film layer with a lower refractive index since tempered glass has a refractive index of about 1.5. In addition to the base substrate, an adhesive layer or an air layer can also be used as a thick-film layer with a lower refractive index. Of course, functional films such as an anti-reflection film, an anti-glare film, and an anti-fog film can also be used as a thick-film layer.

As such, the refractive indices of the first thick-film layer, the second thick-film layers, and the thin-film layer can be variously modified in order to adjust the transmittance and reflectivity of light.

The refractive index of the thin-film layer 742 is denoted with n, the refractive index of the first and second thick-film layers 744 and 746 is denoted with $n_t$. For the sake of convenience, it is assumed that the first and second thick-film layers 744 and 746 have the same refractive index, but the present invention is not limited thereto. The refractive index of the first thick-film layer and the refractive index of the second thick-film layer can preferably be the same or have a difference by 1 or less.

The first thick-film layer 744 is located facing the display panel, and the second thick-film layer 746 is located facing the user. Light incident upon the first thick-film layer 744 satisfies Equation 1 below, derived from Snell's law.

$$n_t \sin \theta_t = n_o \sin \theta_o \qquad \text{Equation 1}$$

When light 880 enters the thin-film layer 742 from the display panel through the interface between the first thick-film layer 744 and the thin-film layer 742, a portion of the light 880 is refracted as it passes through the interface, while another portion of the light 880 is reflected at the interface. In Equation (1), $\theta_t$ denotes the angle of the light 880 with respect to the normal of the interface (angle of incidence), and $\theta$ denotes the angle of the refracted light 881 entering the thin-film layer with respect to the normal of the interface (angle of refraction).

At the interface between the thin-film layer 742 and the second thick-film layer 746, the light 881 is divided again into transmission light 882, which is refracted as it passes through the interface, and reflected light 883, which is reflected at the interface. The angle of the transmission light 882 with respect to the normal of the interface between the thin-film layer 742 and the second thick-film layer 746 is determined by the difference between the refraction index of the thin-film layer 742 and that of the second thick-film layer 746. Provided that the first and second thick-film layers 744 and 746 have the same refractive index, the angle of the light 882 entering the second thick-film layer 746 with respect to the normal of the interface between the thin-film layer 742 and the second thick-film layer 746 is $\theta_t$. Based on Snell's law, the angle $\theta_t$ can be expressed by the angle $\theta_o$ of light 889 incident upon the optical filter from the display panel, the refractive index of the thick-film layers $n_t$, and the refractive index of the air $n_O(=1)$.

When the light 889 from the display panel passes through the optical filter, the angle of light exiting the optical filter is the same as the angle of incidence $\theta_O$ according to Snell's law. Accordingly, the angle of incidence $\theta_O$ corresponds to the viewing angle of the user.

Reflectivity at a respective interface can be expressed by Equations 2 and 3 below.

$$R_p = [(n_t \cos \theta - n \cos \theta_t)/(n_t \cos \theta + n \cos \theta_t)]^2 \qquad \text{Equation 2}$$

$$R_s = [(n \cos \theta - n_t \cos \theta_t)/(n \cos \theta + n_t \cos \theta_t)]^2 \qquad \text{Equation 3}$$

In Equations 2 and 3 above, $R_p$ denotes the reflectivity of p-polarized light, and $R_s$ denotes the reflectivity of s-polarized light. It can be appreciated that the reflectivity $R_p$ and the reflectivity $R_s$ vary according to the refractive index of the thin-film layer n, the refractive index of the thick-film layers $n_t$, the angle of incidence $\theta_t$, and the angle of refraction $\theta$.

In Equation 4 below, reflectivity R is an average of $R_p$ of Equation 2 and $R_s$ of Equation 3.

The reflection light 883 is divided again into a ray of light 887, which is refracted at the interface, and a ray of light 884, which is reflected at the interface. This process of refraction and reflection at the interface is repeated.

In Equation 4 below, transmittance T is the total of the transmittance $T_1$ of the transmitted light 882 and the transmittance $T_2$ of transmitted light 885. Although only two refracted rays are shown in FIG. 7, reflection and refraction repeatedly occur at the interface, and the transmittance T is the total transmittance of all rays of refracted light.

In Equation 4 below, reflectivity R of the interface is the sum of reflectivity R1 of the light 887 and reflectivity R2 of the light 888. Likewise, although only two reflected rays are shown in FIG. 7, the reflectivity R is the total reflectivity of all rays of light reflected from the interface.

In the process that light is repeatedly reflected by the two interfaces defined by the first thick-film layer 744, the thin-film layer 742, and the second thick-film layer 746, the transmittance can be varied according to wavelengths due interference.

In order to compensate for color shift in white light having a high gray scale level according to an increase in the viewing angle, the thickness l of the thin-film layer, the refractive index n of the thin-film layer, and the reflectivity R at the interface between the first thick-film layer and the thin-film layer are adjusted so that the average of the transmittance T according to Equation 4 can be maximized in the blue wavelength range.

$$T = (1-R)^2/(1+R^2-2R \cos \delta) \qquad \text{Equation 4}$$

In Equation 4, $\delta$ denotes the phase difference between the light 882 and the light 885, both of which pass through the thin-film layer, as expressed in Equation 5 below.

$$\delta = (2\pi/\lambda)2nl \cos \theta (0° \leq \theta 80°) \qquad \text{Equation 5}$$

In Equation 5, the phase difference $\delta$ is determined by refractive index n, thickness l, angle of refraction $\theta$, and wavelength $\lambda$.

A constructive or destructive interference may occur according to the phase difference. The maximum transmittance can be obtained when the optical path length difference between the light 882 and the light 885, both of which pass through the thin-film layer, is an integer multiple of the wavelength.

The phase difference $\delta$ is determined when the refractive index n, the thickness l, and the angle of refraction $\theta$ of the thin-film layer are determined for a specific wavelength range. Here, the angle of refraction $\theta$ is a value that is automatically determined when the refractive index n of the thin-film layer, the refractive index $n_t$ of the thick-film layers, and the viewing angle $\theta_o$ are set.

It could be appreciated from Equations 1 through 3 above that the reflectivity varies according to the refractive indices n and $n_t$ of the thin- and thick-film layers and the viewing angle $\theta_o$. Accordingly, the reflectivity can be determined by adjusting the refractive indices n and $n_t$ of the thin- and thick-film layers with respect to the viewing angle $\theta_o$.

As seen from Equation 4 above, the transmittance T is determined when the reflectivity R and the phase difference $\delta$ are set. Accordingly, the transmittance with respect to a specific viewing angle and a specific wavelength of light can be adjusted by selecting the refractive indices n and $n_r$ of the thin- and thick-film layers and the thickness l of the thin-film layer.

For example, the transmittance of a specific wavelength of light at a large viewing angle can be increased by selecting the thickness of the thin-film layer to be 780 nm or less, and setting the refractive index of the thin-film layer to be in the range of 1 to 2 and the refractive index of the thick-film layers to be in the range of 2 to 4. The same result can be obtained if the index settings are swapped, where the refractive index of the thin-film layer is set to be in the range of 2 to 4 and the refractive index of the thick-film layers is set to be in the range of 1 to 2.

In the optical filter having the thick-film/thin-film/thick-film structure, the ratio of the minimum transmittance with respect to the maximum transmittance in a wavelength range of visible light of 380 nm to 780 nm can range from 0.5 to 0.9.

Accordingly, multiple beam interference makes it possible to compensate for the phenomenon that the intensity of light decreases in a relatively greater quantity in the blue wavelength range according to an increase in the viewing angle. Specifically, in a large viewing angle range up to about 80 degrees, transmittance increases in the blue wavelength range due to constructive interference but decreases in the green and red wavelength ranges due to destructive interference. This can compensate for the imbalance in the blue wavelength range even at a large viewing angle by adjusting the decrement of light intensity to be the same or similar over the entire wavelength ranges. The optical filter having the thick-film/thin-film/thick-film structure shown in FIG. 6 can effectively compensate for the color shift in white light at the full gray scale level according to an increase in the viewing angle.

However, the optical filter shown in FIG. 6 cannot minimize color shift in all colors according to an increase in the viewing angle.

Figure 8:
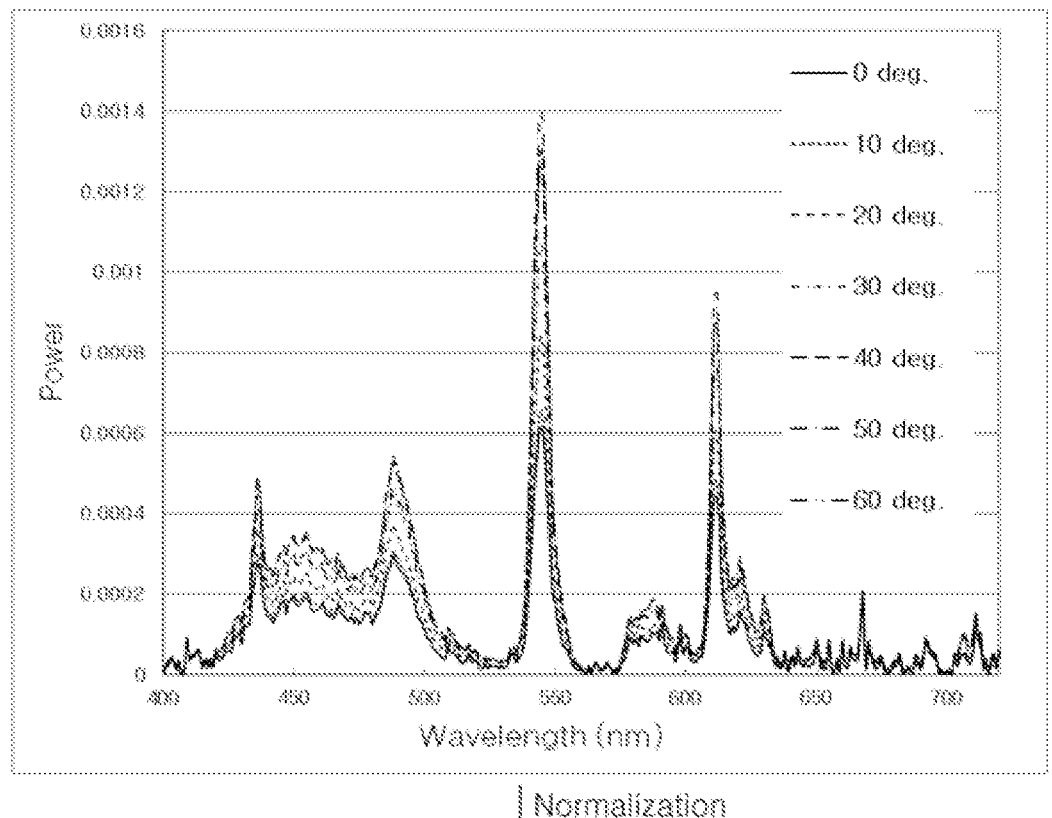
FIG. 8 is a pair of graphs illustrating variations in a spectrum according to an increase in the viewing angle, when a conventional LCD to which both the approaches to compensating for color shift shown in FIGS. 3 and 4 are applied, displays white-light at a low gray scale level.
Figure 8:
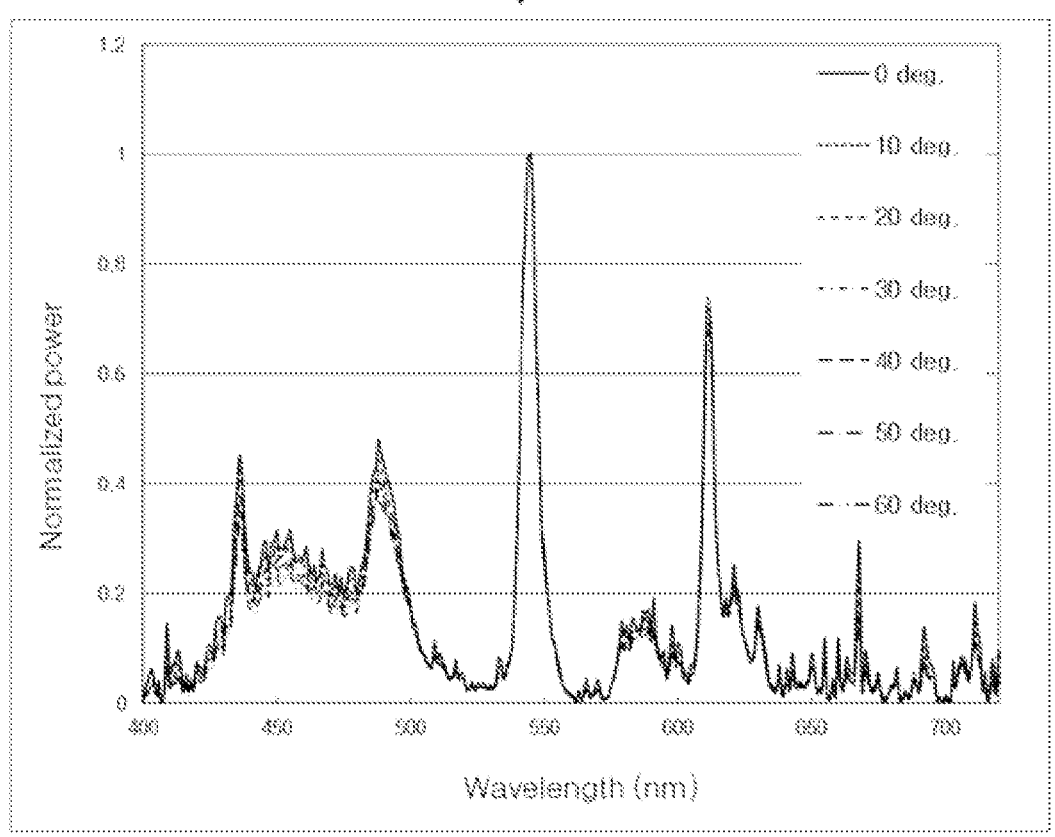

FIG. 8 is a pair of graphs illustrating variations in a spectrum according to an increase in the viewing angle, when a conventional LCD to which both the approaches to compensating for color shift shown in FIGS. 3 and 4 are applied, displays white-light at a low gray scale level.

Since an LCD expresses a variety of colors as well as white when reproducing actual images or moving pictures, color shift compensation plays an important role in securing the wide viewing angle.

The display industry generally uses thirteen (13) colors such as white, red, blue, green, skin, sony red, sony blue, sony green, cyan, purple, yellow, moderate red, and purplish blue as the standard of evaluation. The optical filter shown in FIG. 6 alone cannot minimize the color shift in all colors.

This is because, when light at a high gray scale level is emitted from the display panel, the luminance of light decreases in entire wavelength ranges according to an increase in the viewing angle, particularly, decreases much more in the blue wavelength range but relatively least in the green wavelength range. However, when light at a low gray scale level is emitted, the luminance of light increases over the entire wavelength ranges, particularly, increases much more in the green wavelength range.

Light with compound color can be obtained by combining green light, red light, and blue light at various gray scale levels as shown in Table 1 below. Accordingly, it is necessary to compensate for color shift in a variety of compound colors according to an increase in the viewing angle.

TABLE 1

|  | Color | R | G | B |
|---|---|---|---|---|
| 1 | White | 255 | 255 | 255 |
| 2 | Red (primary) | 255 | 0 | 0 |
| 3 | Green (primary) | 0 | 255 | 0 |
| 4 | Blue (primary) | 0 | 0 | 255 |
| 5 | Skin | 197 | 151 | 130 |
| 6 | Red (sony) | 178 | 47 | 58 |
| 7 | Green (sony) | 69 | 150 | 70 |
| 8 | Blue (sony) | 46 | 62 | 151 |
| 9 | Cyan | 86 | 133 | 135 |
| 10 | Purple | 92 | 59 | 107 |
| 11 | Yellow | 213 | 222 | 53 |
| 12 | Moderate Red | 197 | 86 | 98 |
| 13 | Purplish blue | 74 | 92 | 165 |

Figure 9:
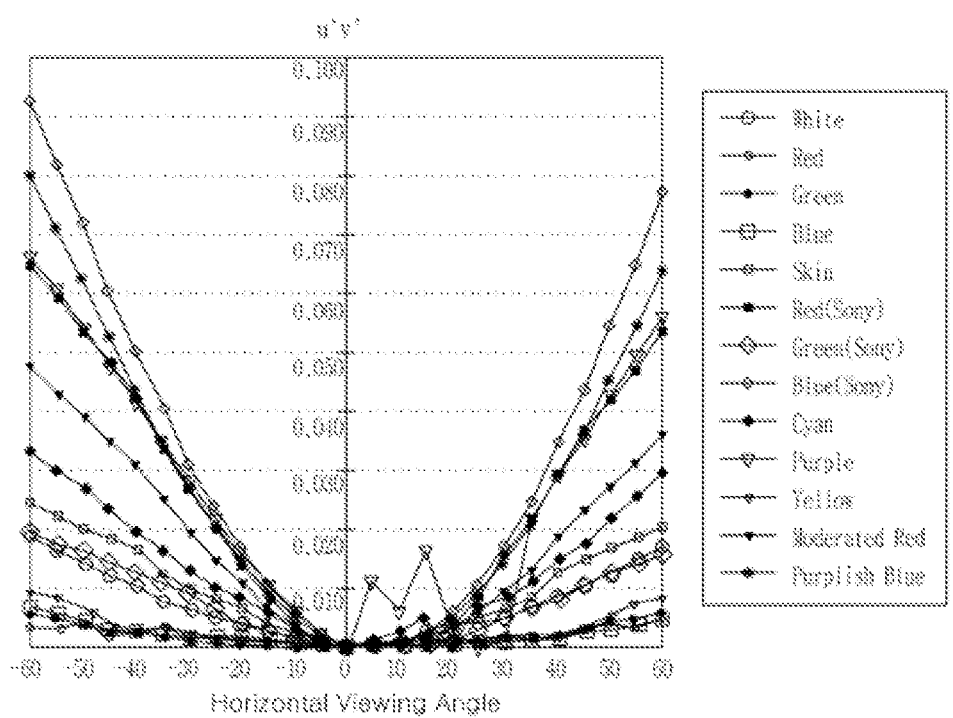
FIG. 9 is a graph illustrating color shifts $^\Delta u'v'$ ($\theta$) in thirteen (13) compound colors according to a change in the viewing angle $\theta$ in a conventional LCD.
Figure 10:
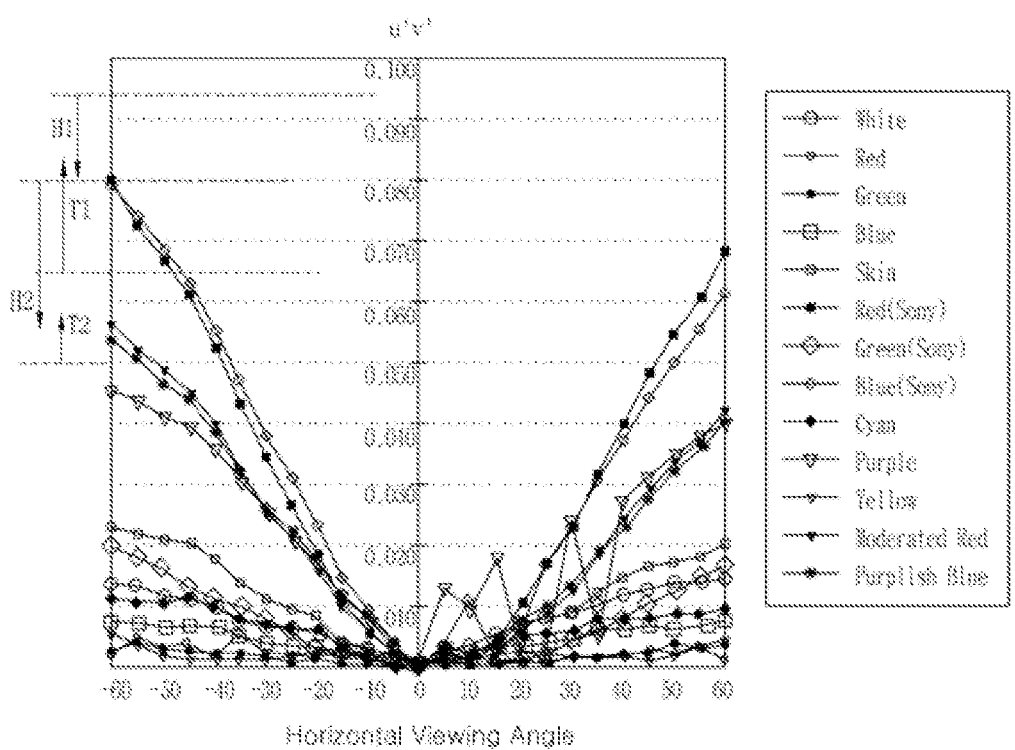
FIG. 10 is a graph illustrating color shifts $^\Delta u'v'$ ($\theta$) in thirteen (13) compound colors according to a change in the viewing angle $\theta$ in an LCD employing the optical filter shown in FIG. 6.

FIG. 9 is a graph illustrating color shifts $^\Delta u'v'(\theta)$ in thirteen (13) compound colors according to a change in the viewing angle $\theta$ in a conventional LCD, and FIG. 10 is a graph illustrating color shifts $^\Delta u'v'(\theta)$ in thirteen (13) compound colors according to a change in the viewing angle $\theta$ in an LCD employing the optical filter shown in FIG. 6.

$^\Delta u'v'(\theta)$ denotes the length between color coordinates ($u_0$, $v_0$) at the viewing angle of 0 degree and color coordinates ($u_\theta$, $v_\theta$) at respective viewing angles $\theta$, and can be expressed by the following equation:

$$^\Delta u'v'(\theta) = [(u_0 - u_\theta)^2 + (v_0 - v_\theta)^2]^{1/2}.$$

In the above-mentioned graphs, the horizontal axis denotes a horizontal viewing angle.

As shown in the graphs of FIGS. 9 and 10, when the optical filter shown in FIG. 6 is used, blue-based compound colors show a decrease in color shift $^\Delta u'v'$ as denoted by H1 and H2 at the horizontal (right/left) viewing angle of 60°. In contrast, red-based compound colors show an increase in color shift $^\Delta u'v'$ as denoted by T1 and T2 at the horizontal viewing angle of 60°. Accordingly, the optical filter shown in FIG. 6 cannot compensate for color shift in the entire 13 compound colors.

First Embodiment

Figure 11:
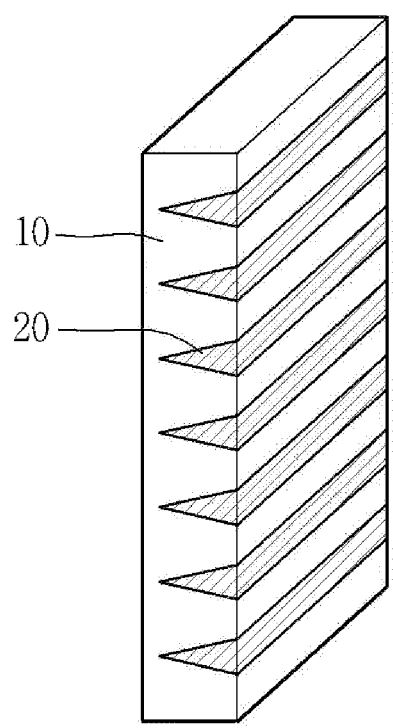
FIG. 11 is a perspective view schematically illustrating an optical filter for compensating for color shift in accordance with a first exemplary embodiment of the invention.

FIG. 11 is a perspective view schematically illustrating an optical filter for compensating for color shift in accordance with a first exemplary embodiment of the invention.

The optical filter in accordance with a first exemplary embodiment of the invention is provided in front of a display panel of a display device. The optical filter of this embodiment is typically applicable to an LCD but the present invention is not limited thereto.

As shown in FIG. 11, the optical filter includes a background layer 10 and a green wavelength absorption pattern 20.

In FIG. 11, the green wavelength absorption pattern 20 is provided on one surface of the background layer 10 facing the display panel. The green wavelength absorption pattern 20 is composed of a plurality of green wavelength absorption stripes, which are spaced apart from each other at predetermined intervals to be parallel to each other. The green wavelength absorption pattern can also be provided on the other surface of the background layer, facing the user, or on both the opposite surfaces of the background layer.

The green wavelength absorption pattern 20 is provided with a predetermined thickness on the background layer 10.

The green wavelength absorption pattern can be provided with a variety of shapes as long as it has a thickness that can absorb the green wavelength of light which is emitted at a predetermined viewing angle. For example, the green wavelength absorption pattern can include, but not limited to, stripes with a wedge-shaped cross section, waves with a wedge-shaped cross section, a matrix with a wedge-shaped cross section, a honeycomb with a wedge-shaped cross section, stripes with a quadrangular cross section, waves with a quadrangular cross section, a matrix with a quadrangular cross section, or a honeycomb with a quadrangular cross section. FIG. 11 illustrates the green wavelength absorption pattern 20 composed of stripes with a wedge-shaped cross section. The wedge-shaped cross section includes a triangular cross section and a trapezoidal cross section.

The green wavelength absorption pattern can be oriented in various directions with respect to the user such as in horizontal and vertical directions. The green wavelength absorption pattern can effectively compensate for color shift according to vertical viewing angles when oriented in the horizontal direction, and can effectively compensate for color shift according to horizontal viewing angles when oriented in the vertical direction. The green wavelength absorption pattern 20 can be provided with a predetermined bias angle with respect to longer edges of the background layer in order to prevent a Moire phenomenon.

The green wavelength absorption pattern absorbs a green wavelength of light. The green wavelength absorption pattern is provided on one surface of the background layer 10 to minimize color shift in light with compound colors according to an increase in the viewing angle by increasing the absorption of light over the entire wavelength ranges according to the increase in the viewing angle, particularly, much more increasing the absorption of light in the green wavelength range of 510 nm to 560 nm.

When light emitted from the display panel has a low gray scale level, luminance increases in the whole wavelength range according to an increase in the viewing angle, and luminance in a green wavelength range increases much more. Since light with compound color is obtained by combining green light, red light and blue light at various gray scale levels, it is difficult to compensate for color shift in all types of compound colors using only the film for compensating for color shift as shown in FIG. 6. Accordingly, it is possible to minimize color shift in the compound color according to an increase in the viewing angle by gradually increasing the absorption of light in all wavelength ranges according to an increase in the viewing angle, particularly, much more increasing the absorption of a green wavelength of light according to an increase in the viewing angle.

In order to absorb the green wavelength, the green wavelength absorption pattern 20 can contain a green wavelength absorbing material that can absorb a green wavelength of light in the range of 510 nm to 560 nm. The green wavelength absorbing material can be, for example, an inorganic or organic material that can absorb a green wavelength of light in the range of 510 nm to 560 nm. Preferably, a pink colorant can be used.

The green wavelength absorbing pattern 20 can be produced by filling grooves formed on one surface of the background layer with an ultraviolet (UV) curing resin containing a green wavelength absorbing material and irradiating the green wavelength absorbing material in the grooves with UV rays.

The background layer forms a layer, and is typically made of a transparent polymer resin. The background layer 10 can be made in the form of a plate by, for example, a roll-to-roll method using a UV curing resin, a thermal press method using a thermoplastic resin, or an injection molding method using a thermosetting resin.

The thickness T of the background layer 10 can preferably be set in the range of 50 μm to 1 mm. The thickness T of the background layer 10 is set to be 50 μm or more so as to obtain more flexible characteristics and a thinner profile as long as the mechanical properties and heat resistance of the background layer can be secured. In addition, the thickness T of the background layer 10 is set to be 1 mm or less such that the mechanical properties of the background layer are of excellent quality as long as the flexibility, the thin profile, and the optical transmittance of the background layer can be secured.

The background layer 10 can be made of any highly-transparent materials that basically allow light to pass through. For example, the background layer 10 can be made of one selected from the group consisting of polyesters, acryls, celluloses, polyolefins, polyvinyl chlorides (PVC), polycarbonates (PC), phenols, and urethanes, which are light, inexpensive, and easily manufacturable.

The optical filter can also have a backing layer (not shown), which is provided on one surface of the background layer to support the background layer.

The backing layer acts as a support on which the background layer 10 can be formed in a manufacturing process. The backing layer can preferably be made of a transparent resin film that is UV transparent. The backing layer can be made of, for example, Polyethylene Terephthalate (PET), polycarbonate (PC), polyvinyl chloride (PVC), or the like.

Figure 12:
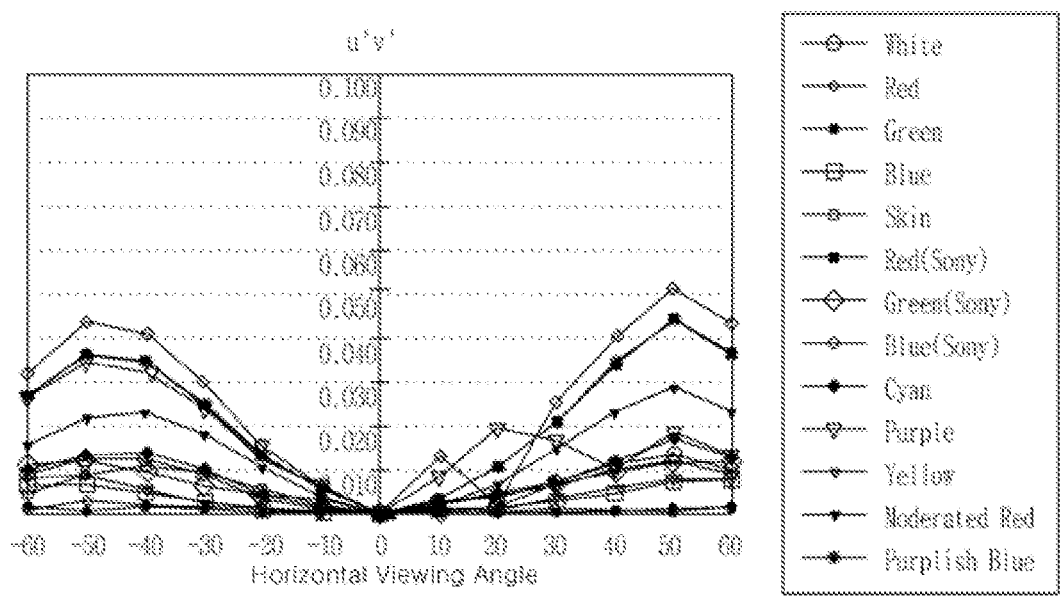
FIG. 12 is a graph illustrating color shift in thirteen compound colors according to a change in the viewing angle in a display device using the optical filter shown in FIG. 11.

FIG. 12 is a graph illustrating color shift in thirteen compound colors according to a change in the viewing angle in a display device using the optical filter shown in FIG. 11.

As shown in FIG. 12, color shifts in thirteen compound colors are measured according to an increase in the viewing angle in the display device using the optical filter in accordance with the first exemplary embodiment of the invention.

Specifically, the filter in accordance with the first exemplary embodiment of the invention minimizes color shift in red-based compound colors (e.g., sony red, moderate red, etc.) and blue-based compound colors (e.g., sony blue, purple, purplish blue, etc.) by absorbing a relatively greater amount of green wavelength light according to the increase in the viewing angle. This, as a result, can finally minimize the color shift in all of the compound colors.

In particular, compared to the color shift Δu'v' with a value up to 0.085 in FIG. 10, the color shift Δu'v' of the 13 compound colors can be reduced to 0.06 or less by using the optical filter shown in FIG. 11. Since the color shift Δu'v' of 0.085 can be noticed with the naked eye, image quality degrades according to an increase in the viewing angle. In contrast, the color shift Δu'v' of 0.06 or less can be rarely noticed with the naked eye. This, as a result, makes it possible to improve the image quality according to an increase in the viewing angle.

Figure 13:
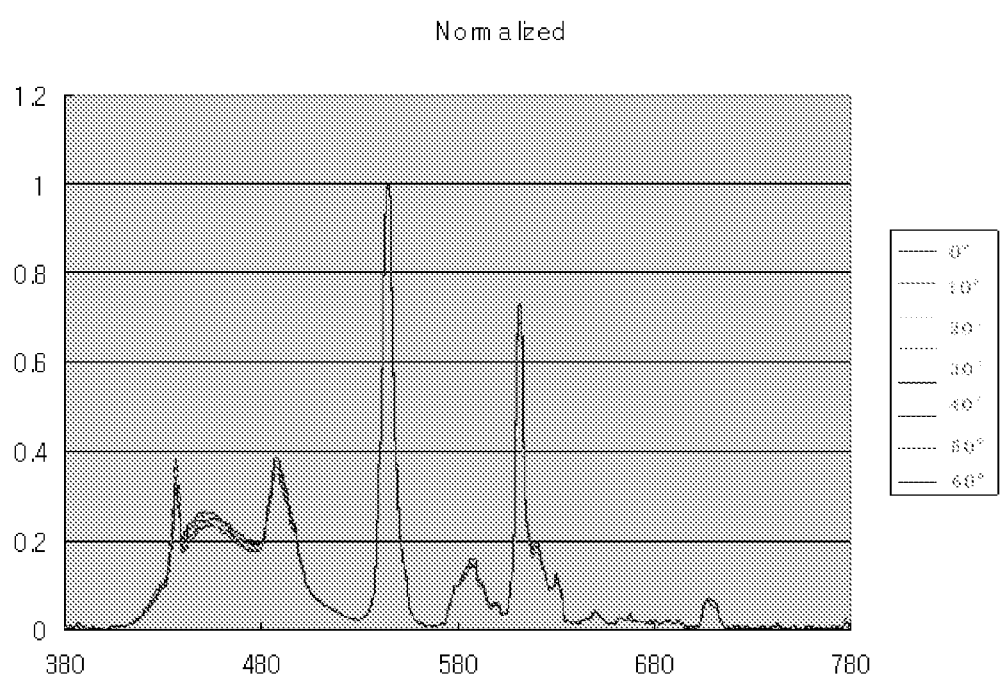
FIG. 13 is a graph illustrating variations in a normalized spectrum according to an increase in the viewing angle, when a display device to which the optical filter shown in FIG. 11 is applied, displays white-light at the full gray scale level.

FIG. 13 is a graph illustrating variations in a normalized spectrum according to an increase in the viewing angle, when a display device to which the optical filter shown in FIG. 11 is applied, displays white-light at the full gray scale level.

As shown in FIG. 13, the decrement in spectrums according to an increase in the viewing angle is substantially the same over the entire wavelength ranges. Accordingly, the color shift according to the increase in the viewing angle is substantially removed.

Figure 14:
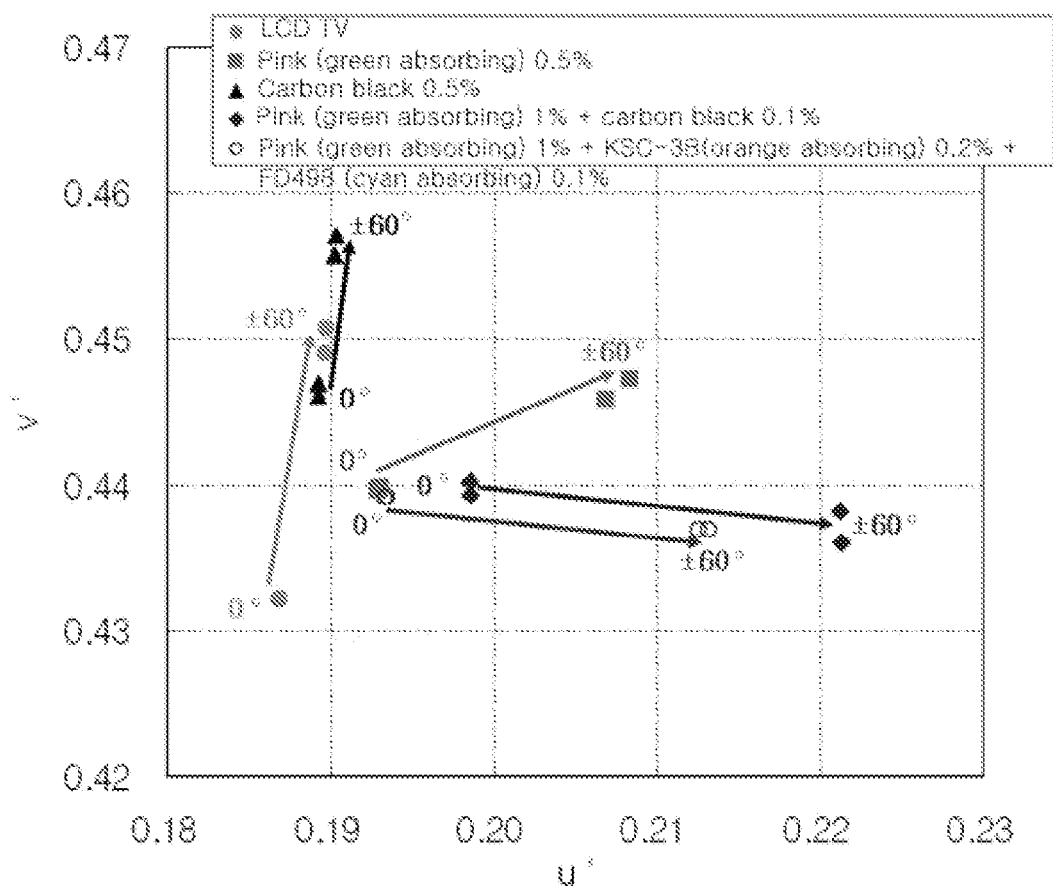
FIGS. 14 is a reference views for explaining the green wavelength absorption pattern.

FIG. 14 is a reference view for explaining the green wavelength absorption pattern 20.

An optical filter with a green wavelength absorption pattern 20 containing a green wavelength absorbing material was mounted in an LCD TV, and color coordinates were measured with a full white image, at the front, and at a viewing angle of 60°.

When the green wavelength absorption pattern having a wedge-shaped cross section was filled with the green wavelength absorbing material, the color of the green wavelength absorbing material looked stronger according to an increase in the viewing angle, and color coordinates moved towards pink in the CIE 1976 UCS color coordinate system u'v'. In addition, when the pattern was filled with a carbon black or cyan wavelength absorbing material and an orange wavelength absorbing material, which will be described later, in addition to the green wavelength absorbing material, color coordinates moved towards purplish pink in the color coordinate system u'v'.

In the color coordinate system, the value of $\Delta v'/\Delta u'$, that is, $(v'_{60}-v'_0)/(u'_{60}-u'_0)$ can preferably be in the range of tan(−15°) to tan(45°). ($u'_0$ and $v'_0$ are color coordinate values measured at the front, and $u'_{60}$ and $v'_{60}$ are color coordinate values measured at the viewing angle of 60°.)

Specifically, if the light absorption pattern 23 is filled with only a green wavelength absorbing material, the slope of a change in color coordinates can preferably be in the range of 15° to 45° in the color coordinate system u'v'. If the light absorption pattern 23 is filled with carbon black as well as the green wavelength absorbing material, the slope of a change in color coordinates can preferably be in the range of −15° to 15°. If the light absorption pattern 23 is filled with the cyan wavelength absorbing material and the orange wavelength absorbing material as well as the green wavelength absorbing material, the slope of a change in color coordinates can preferably be in the range of −15° to 15°.

Figure 15:
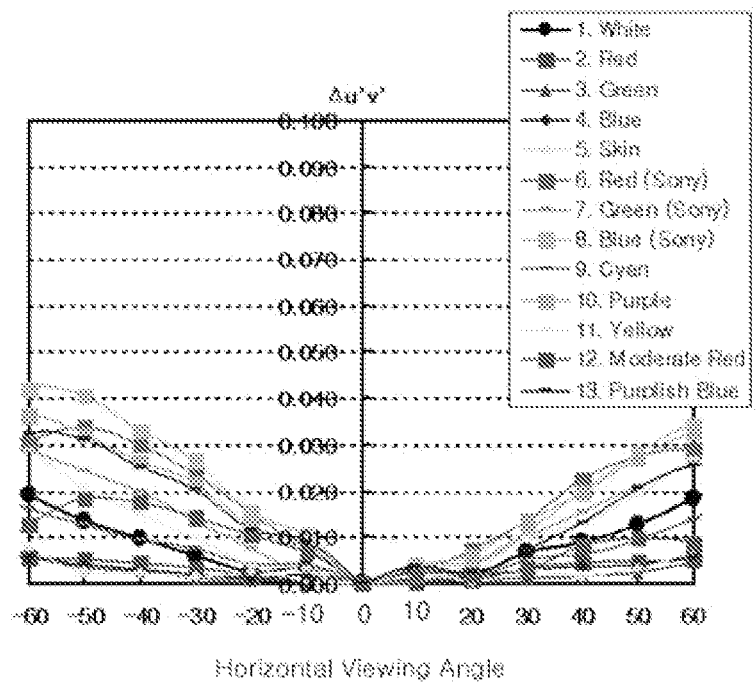
Figure 16:
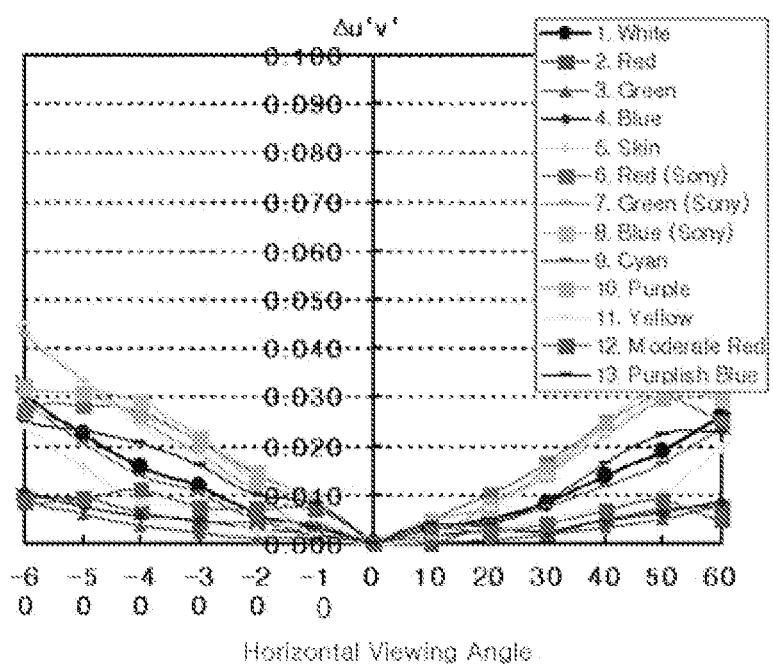

FIGS. 15 and 16 are a pair of graphs illustrating the effect of refractive index over color shift in the optical filter having the green wavelength absorption pattern, in which FIG. 15 shows color shift according to the viewing angle in a case where the refractive index of the background layer is the same as that of the green wavelength absorption pattern, and FIG. 16 shows color shift according to the viewing angle in a case where the refractive index of the background layer is greater than that of the green wavelength absorption pattern by 0.06.

In a film in which the green wavelength absorption pattern including the green wavelength absorbing material is formed on the background layer, the effect of refractive indices on color shift was measured with all other conditions set to be the same.

As shown in FIGS. 15 and 16, color shift Δu'v' is about 0.042 when the refractive index of the background layer is the same as that of the green wavelength absorption pattern and is about 0.045 when the difference between the refractive indices of the background layer and the green wavelength absorption pattern is 0.06. There is no substantial difference between the color shifts.

In contrast, as shown in Table 2 below, the front transmittance in the case where there is a difference between refractive indices is greater than in the case where there is no difference between refractive indices.

TABLE 2

|  | LCD TV | Same refractive index | Refractive index difference = 0.06 |
|---|---|---|---|
| Luminance (nit) | 431.5 | 328.3 | 344.8 |
| Transmittance | 100% | 76% | 80% |

In Table 2 above, the transmittance difference of 4% can have different meanings according to the amount of light emitted from the display device. For example, if the brightness of light emitted from the LCD is 50 nit (i.e., the level of a portable phone), the difference is about 2 nit, which is rarely distinguishable by the human eye. In contrast, if the brightness is 500 nit or more (i.e., the level of an LCD TV), the difference is about 20 nit, which is distinguishable by the human eye. Considering the brightness of LCD TVs is increasing, the increase in the transmittance by 4%, in itself, has important technical significance.

FIGS. 15 and 16 and Table 2 show the test results obtained from a filter in which the refractive index of the background layer is greater than that of the green wavelength absorbing pattern. In contrast, the refractive index of the green wavelength can be greater than that of the background layer.

The difference of the refractive index between the green wavelength absorption pattern and the background layer can preferably be in the range of 0.001 to 0.1.

Second Embodiment

Figure 17:
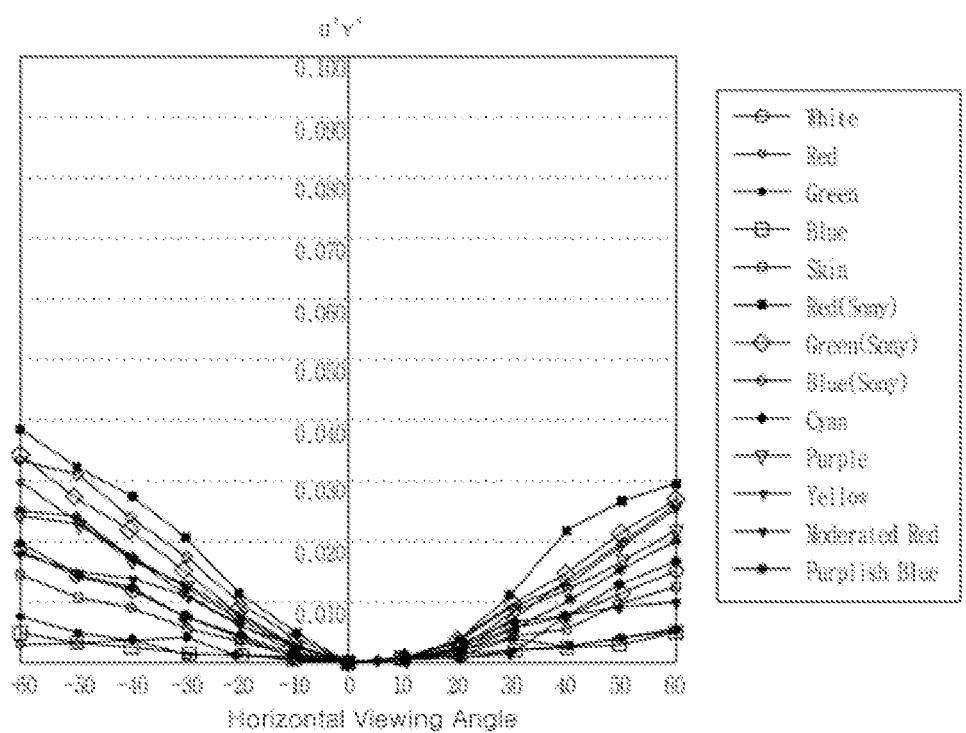
FIG. 17 is a graph illustrating color shift in thirteen (13) colors in a display device which has an optical filter in accordance with a second embodiment of the invention, according to a change in the viewing angle.

FIG. 17 is a graph illustrating color shift in thirteen (13) colors according to a change in the viewing angle in a display device which has an optical filter in accordance with a second embodiment of the invention.

The optical filter in accordance with the second embodiment has a green wavelength absorbing pattern, which contains a white light absorbing material capable of absorbing the entire wavelength range of visible light as well as a green wavelength absorbing material.

The white light absorbing material can be an inorganic material, an organic material, and/or a metal having block color. More preferably, the white light absorbing material can be carbon black.

The green wavelength absorption pattern 20 can be made of an UV curing resin that contains a green wavelength absorbing material and a white light absorbing material.

For example, the green wavelength absorption pattern 20 can include the green wavelength absorbing material of about 1 wt % and the white light absorbing material of about 0.5 wt %, contained in the UV curing resin.

The transmittance and the viewing angle are determined by the pitch, the thickness, the larger width, the smaller width, and the slope of an inclined surface of the green wavelength absorbing pattern 20.

If the thickness, the width, and light absorptivity of the green wavelength absorption pattern 20 are decreased, the effect of compensating for color shift according to the viewing angle increases. However, the transmittance of light significantly decreases according to the viewing angle since the green wavelength absorption pattern 20 also absorbs light passing through the filter.

If the thickness of the green wavelength absorption pattern increases, the thickness of the background layer 10 also increase, which makes it difficult to bend the background layer 10. Since the background layer 10 may be fractured if bent to a certain extent, it is not easy to manufacture the background layer 10 by a roll molding process. Furthermore, the produced background layer 10 is not easily wound in the form of a roll, thereby causing a storage problem.

In addition, increasing the width of the green wavelength absorption pattern causes a decrease in the opening ratio, which determines the amount of light passing through the filter, thereby reducing the transmittance of light. In addition, increasing the content of the white light absorbing material to enhance the effect of blocking white light also causes a rise in the viscosity of the mixture contained in the pattern, which makes it difficult to inject the mixture into the grooves. Accordingly, the thickness, the width, and the light absorptivity of the green wavelength absorption pattern 20 should be given optimum values.

The width of the green wavelength absorption pattern can preferably in the range of 1 μm to 50 μm.

In the green wavelength absorption pattern, the width of the base (i.e., the larger width) of the wedge-shaped cross section can be 40% or less of the pitch, and the slope of the inclined surface can be 10°.

Third Embodiment

Figure 18:
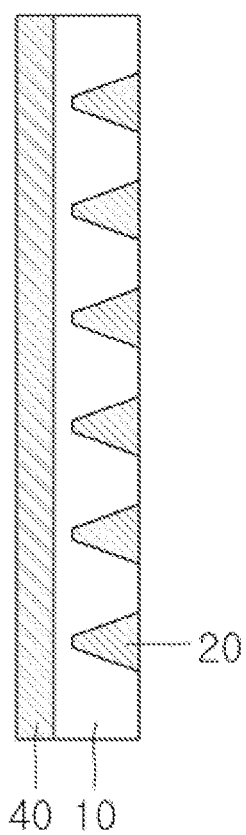
FIG. 18 is a cross-sectional view schematically illustrating an optical filter in accordance with a third exemplary embodiment of the invention.

FIG. 18 is a cross-sectional view schematically illustrating an optical filter in accordance with a third exemplary embodiment of the invention.

While light emitted in the directly forward direction from a display panel passes through the optical filter, the color of an image of the display may be changed by a green wavelength absorbing material of a green wavelength absorption pattern. Accordingly, a green's complementary color absorbing part is provided, which contains a red wavelength absorbing material and a blue wavelength absorbing material as color-correcting colorants. This configuration serves to correct the color of the light emitted in the directly forward direction to be similar to the original color.

FIG. 18 shows an exemplary embodiment, in which the green's complementary color absorbing part is a green's complementary color absorbing layer 40.

The green's complementary color absorbing layer 40 is stacked over one surface of the background layer 10. The green's complementary color absorbing layer contains a green's complementary color absorbing material that absorbs a certain wavelength of light complementary to green. The green's complementary color absorbing material can be a red wavelength absorbing material that absorbs a red wavelength range of 600 nm to 650 nm while allowing a green wavelength range to pass through and/or a blue wavelength absorbing material (e.g, a yellow colorant) that absorbs a blue wavelength range of 440 nm to 480 nm while allowing the green wavelength range to pass through.

The green's complementary color absorbing layer can be implemented in the form of a film or an adhesive layer. If the green's complementary color absorbing layer is a separate film, it can be a dedicated film for absorbing green's complementary color or a functional film having other functions. For example, at least one of a first thick-film layer, a thin-film layer, and a second thick-film layer which will be described below can be used as the green's complementary color absorbing layer by containing the green's complementary color absorbing layer material therein.

While FIG. 18 illustrates the exemplary embodiment in which the green's complementary color absorbing layer is in surface contact with the background layer 10, another layer can be sandwiched between the background layer and the green's complementary color absorbing layer.

If the green's complementary color absorbing layer is provided in the form of an adhesive layer or a background layer containing a color-correcting colorant instead of a separate film, it is possible to simplify the structure of the optical filter and a manufacturing process thereof.

Figure 19:
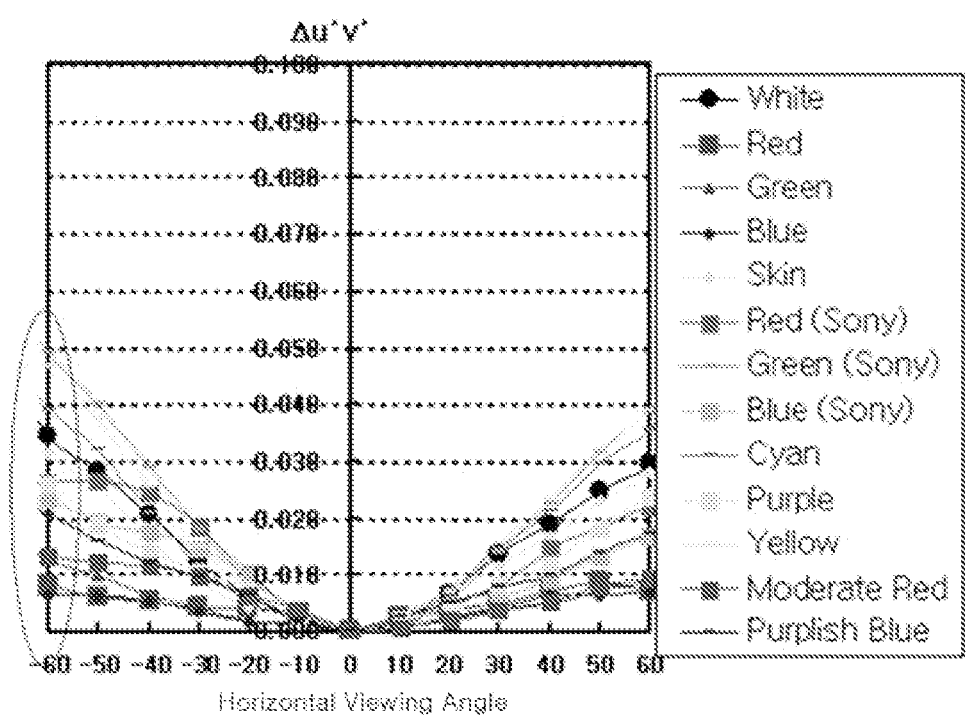
FIG. 19 is a graph illustrating a variation in color coordinates according to an increase in the viewing angle when an optical filter is provided, which includes only the green wavelength absorption pattern without the green's complementary color absorbing part.
Figure 20:
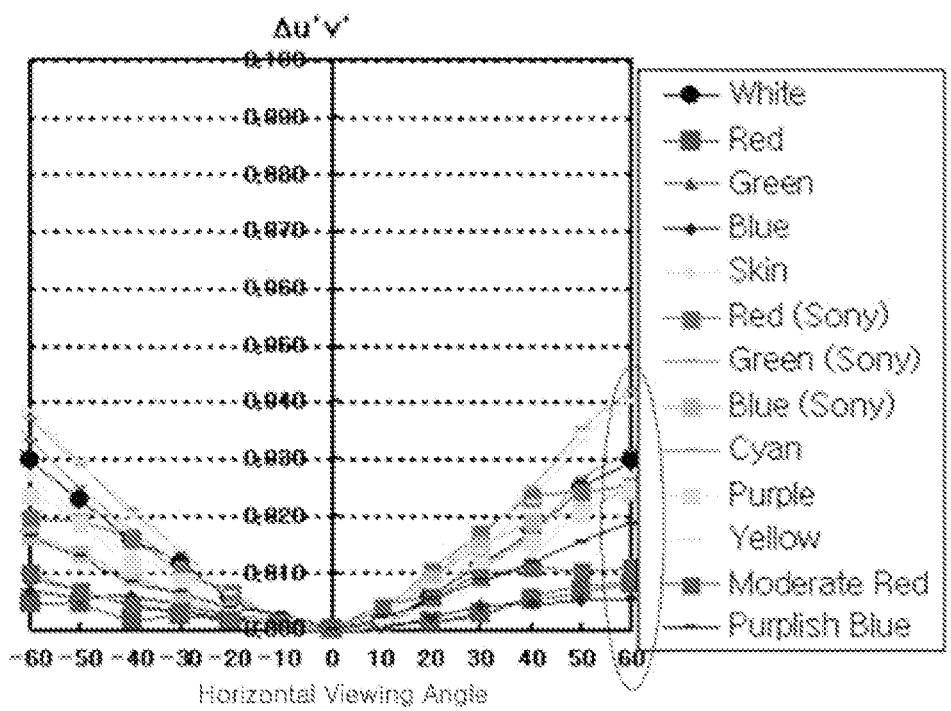
FIG. 20 is a graph illustrating a variation in color coordinates according to an increase in the viewing angle when an optical filter is provided, which includes both the green wavelength absorption pattern and the green's complementary color absorbing part.

FIG. 19 is a graph illustrating a variation in color coordinates according to an increase in the viewing angle when an optical filter is provided, which includes only the green wavelength absorption pattern without the green's complementary color absorbing part, and FIG. 20 is a graph illustrating a variation in color coordinates according to an increase in the viewing angle when an optical filter is provided, which includes both the green wavelength absorption pattern and the green's complementary color absorbing part.

As shown in FIGS. 19 and 20, it can be appreciated that the example shown in FIG. 20 can further compensate for color shift in compound colors.

Table 3 below shows the test results on color coordinates of white light exiting a display, measured at the front at a viewing angle of 0°.

TABLE 3

|  | Including only green wavelength absorption pattern | Including both green wavelength absorption pattern and green's complementary color absorbing part |
| --- | --- | --- |
| Color coordinates of white light (CIE 1936) | (0.28505, 0.292492) | (0.3123, 0.3271) |

As shown in Table 3 above, white light has colors instead of showing the original achromatic color when only the green wavelength absorbing pattern is provided. In contrast, when the green's complementary color absorbing part is also provided, white light can maintain the original achromatic color.

Fourth Embodiment

Figure 21:
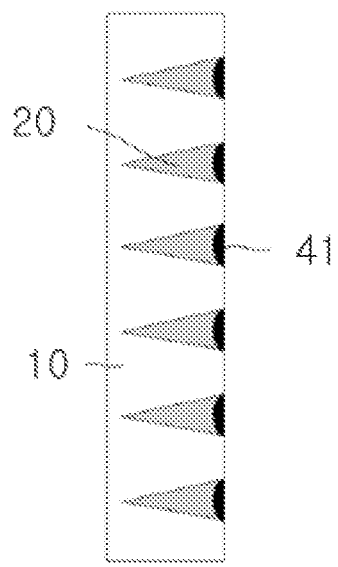
FIG. 21 is a perspective view schematically illustrating an optical filter in accordance with a fourth exemplary embodiment of the invention.

FIG. 21 is a perspective view schematically illustrating an optical filter in accordance with a fourth exemplary embodiment of the invention.

As shown in FIG. 21, a green's complementary color absorbing part can be provided in the form of a green's complementary color absorbing patch 41 on one side of the green wavelength absorbing pattern 20. In FIG. 21, the green's complementary color absorbing part is provided on the rear surface of the green wavelength absorbing pattern, that is, the base of a wedge-shaped cross section.

The green wavelength absorbing pattern and the green's complementary color absorbing patch can be formed by a doctoring process. For example, after the green wavelength absorbing pattern is formed, the green's complementary color absorbing patch 41 can be formed by applying a UV curing resin which contains a green's complementary color absorbing material, onto the base of the green wavelength absorbing pattern inside recessed grooves and then curing the UV curing resin.

The optical filter of this embodiment advantageously has more excellent transmittance of light than the above-described optical filter in accordance with the third exemplary embodiment.

Fifth Embodiment

The green wavelength absorption pattern can further contain a material absorbing orange wavelength light and a material absorbing cyan wavelength light, which have a bad effect on the color shift according to the viewing angle. The orange wavelength absorbing material and/or the cyan wavelength absorbing material can be contained in a separate resin film, contained in an adhesive layer, or contained in the background layer.

Sixth Embodiment

Figure 22:
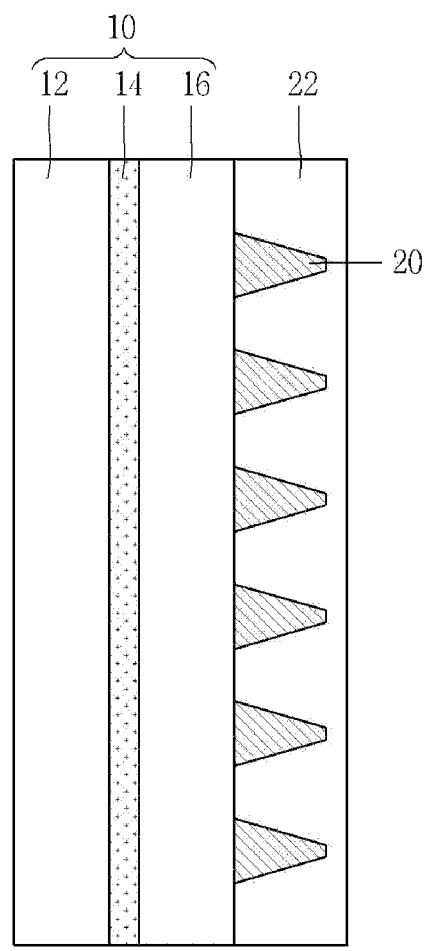
FIG. 22 is a perspective view schematically illustrating an optical filter in accordance with a sixth exemplary embodiment of the invention.

FIG. 22 is a perspective view schematically illustrating an optical filter in accordance with a sixth exemplary embodiment of the invention.

As shown in FIG. 22, the optical filter includes a first thick-film layer 12, a first thin-film layer 14, and a second thick-film layer 16, which are stacked over one another in the order named. As another exemplary embodiment, the optical filter may further include a second thin-film layer and a third-thick film layer, which are stacked in the order named in succession to the first thick-film layer, the first thin-film layer, and the second thick-film layer.

At least one of the thick-film layers can be a background layer, a base substrate supporting the optical filter for compensating for color shift, a front substrate of the display panel, an anti-glare film, a polarizer film, a retardation film, a diffuser film, an adhesive layer, an air layer, or an equivalent thereof, but the present invention is not limited thereto.

Figure 23:
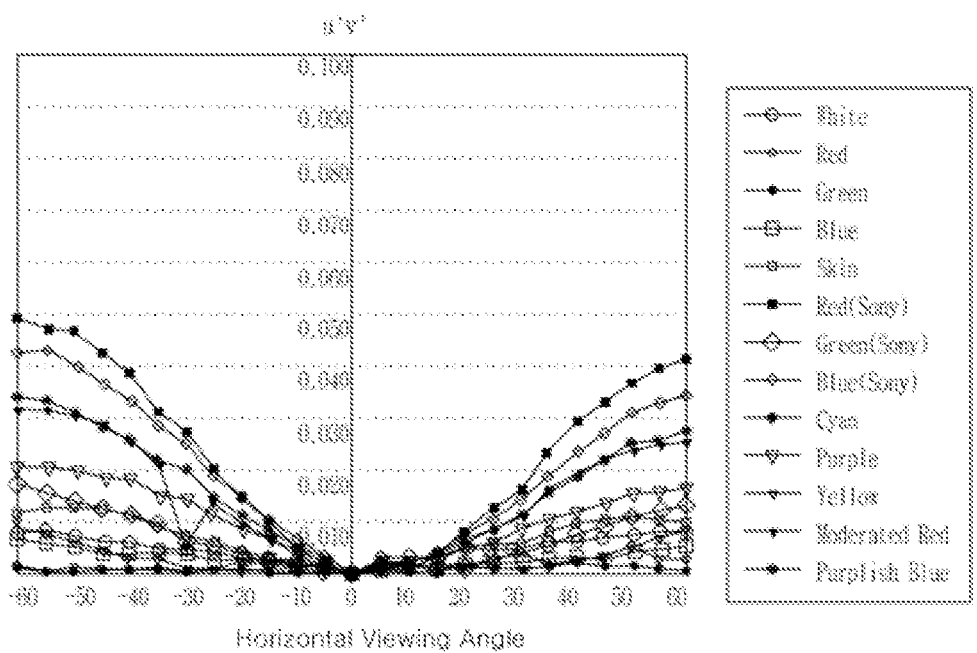
FIG. 23 is a graph illustrating color shift in thirteen compound colors according to a change in the viewing angle in a display device using the optical filter shown in FIG. 22.

FIG. 23 is a graph illustrating color shift in thirteen compound colors according to a change in the viewing angle in a display device using the optical filter shown in FIG. 22.

The optical filter was produced by forming a $Nb_2O_5$ thin film with a thickness of 210 nm on a base substrate of glass, and attaching a film with a green wavelength absorption pattern formed by filling recessed grooves of a background layer with a 1 wt % green wavelength absorbing material (e.g., pink colorant), on the $Nb_2O_5$ thin film using a Pressure Sensitive Adhesive (PSA). Here, the base substrate of glass serves as the thick film, the $Nb_2O_5$ film serves as the thin film, and the PSA layer serves as the thick film.

Color shift $\Delta u'v'$ according to an increase in the horizontal viewing angle was measured. As shown in FIG. 23, it can be appreciated that the color shift in the 13 compound colors is uniformly reduced compared to the graphs shown in FIGS. 9 and 10.

Seventh Embodiment

Figure 24:
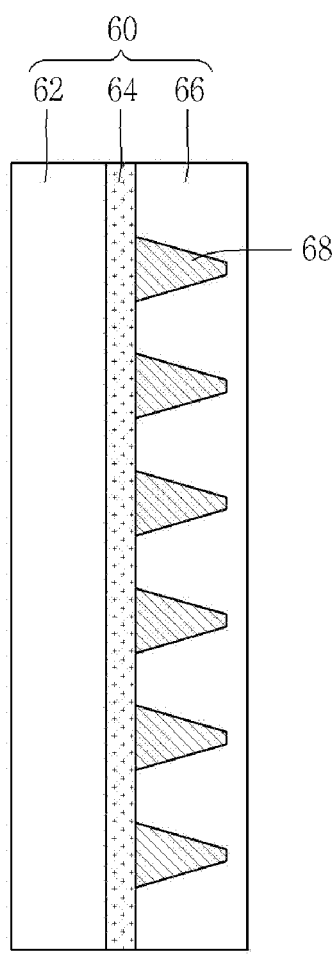
FIG. 24 is a cross-sectional view schematically illustrating an optical filter in accordance with a seventh exemplary embodiment of the invention.

FIG. 24 is a cross-sectional view schematically illustrating an optical filter in accordance with a seventh exemplary embodiment of the invention.

As shown in FIG. 24, a film which includes a background layer and a green wavelength absorption pattern formed on the background layer can be used as the thick-film layer.

As set forth above, the optical filter in accordance with exemplary embodiments of the invention can be provided as an optical filter for compensating for color shift and be provided as a complex optical filter having complex functions, which are produced by stacking the optical filter and another type of functional optical filter (e.g., an anti-fog film, an anti-reflection film, an anti-glare film, a base substrate, etc.) over each other.

Moreover, the optical filter in accordance with exemplary embodiments of the invention can be spaced apart from the display panel or be attached to the display panel by an adhesive.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An optical filter for compensating for color shift provided in front of a display panel of a display device, comprising:
   a background layer; and
   a green wavelength absorption pattern provided with a thickness on the background layer, wherein the green wavelength absorption pattern absorbs a green wavelength of light;
   wherein color shift $\Delta v'/\Delta u'$ in color coordinates is in the range of $\tan(-15°)$ to $\tan(45°)$ at a viewing angle of 60° in relation to the front.

2. The optical filter in accordance with claim 1, wherein the green wavelength absorption pattern comprises stripes with a wedge-shaped cross section, waves with a wedge-shaped cross section, a matrix with a wedge-shaped cross section, a honeycomb with a wedge-shaped cross section, stripes with a quadrangular cross section, waves with a quadrangular cross section, a matrix with a quadrangular cross section, or a honeycomb with a quadrangular cross section.

3. The optical filter in accordance with claim 1, wherein the green wavelength absorption pattern comprises a green wavelength absorbing material that absorbs a green wavelength of light in the range of 510 nm to 560 nm.

4. The optical filter in accordance with claim 3, wherein the green wavelength absorbing material comprises a pink colorant absorbing a green wavelength of light in the range of 510 nm to 560 nm.

5. The optical filter in accordance with claim 1, further comprising a backing layer provided on one surface of the background layer to support the background layer.

6. The optical filter in accordance with claim 1, wherein the display device is a liquid crystal display.

7. The optical filter in accordance with claim 1, wherein the green wavelength absorption pattern further comprises a white light absorbing material.

8. The optical filter in accordance with claim 7, wherein the white light absorbing material comprises a material having black color.

9. The optical filter in accordance with claim 8, wherein the white light absorbing material comprises carbon black.

10. The optical filter in accordance with claim 1, wherein a difference between the refractive index of the background layer and the refractive index of the green wavelength absorption pattern is from 0.001 to 0.1.

11. The optical filter in accordance with claim 1, further comprising a green's complementary color absorbing part that absorbs a wavelength of light complementary to green.

12. The optical filter in accordance with claim 11, wherein the green's complementary color absorbing part comprises a green's complementary color absorbing layer that is a layer of resin into which a green's complementary color absorbing material is mixed.

13. The optical filter in accordance with claim 12, wherein the green's complementary color absorbing layer comprises an adhesive layer into which the green's complementary color absorbing material is mixed.

14. The optical filter in accordance with claim 12, wherein the background layer comprises a green's complementary color absorbing material that absorbs a wavelength of light complementary to green to make the background layer serve as the green's complementary color absorbing layer.

15. The optical filter in accordance with claim 11, wherein the green's complementary color absorbing part comprises a green's complementary color absorbing patch formed on one side of the green wavelength absorption pattern.

16. The optical filter in accordance with claim 15, wherein the green's complementary color absorbing patch is formed on a rear surface of the green wavelength absorption pattern.

17. The optical filter in accordance with claim 15, wherein the green wavelength absorption pattern has a wedge-shaped cross section, and the green's complementary color absorbing patch is formed on a base of the wedge-shaped cross section of the green wavelength absorption pattern.

18. The optical filter in accordance with claim 11, wherein the green's complementary color absorbing part comprises at least one selected from the group consisting of a blue wavelength absorbing material that absorbs a blue wavelength of light in the range of 440 nm to 480 nm and a red wavelength absorbing material that absorbs a red wavelength of light in the range of 600 nm to 650 nm.

19. The optical filter in accordance with claim 11, further comprising a first thick-film layer, a first thin-film layer, and a second thick-film layer, which are stacked over one another in the order named,
   wherein the first thin-film layer has a thickness not exceeding 780 nm, and the first and second thick-film layers have a thickness greater than that of the first thin-film layer, and wherein at least one of the first thick-film layer, the first thin-film layer, and the second thick-film layer is the green's complementary color absorbing part.

20. The optical filter in accordance with claim 1, further comprising a first thick-film layer, a first thin-film layer, and a second thick-film layer, which are stacked over one another in the order named,
wherein the first thin-film layer has a thickness not exceeding 780 nm, and the first and second thick-film layers have a thickness greater than that of the first thin-film layer.

21. The optical filter in accordance with claim 20, further comprising a second thin-film layer and a third thick-film layer, which are stacked in the order named in succession to the first thick-film layer, the first thin-film layer, and the second thick-film layer.

22. The optical filter in accordance with claim 20, wherein at least one of the first and second thick-film layers comprises a background layer, a base substrate supporting the optical filter for compensating for color shift, a front substrate of the display panel, an anti-glare film, a polarizer film, a retardation film, a diffuser film, an adhesive layer, or an air layer.

23. A display device comprising the optical filter for compensating for color shift as recited in claim 1.

* * * * *